(12) United States Patent
Castro-Schilo et al.

(10) Patent No.: US 11,017,308 B2
(45) Date of Patent: May 25, 2021

(54) GRAPHICAL INTERACTIVE MODEL SPECIFICATION GUIDELINES FOR STRUCTURAL EQUATION MODELING DESIGNS

(71) Applicant: SAS Institute Inc., Cary, NC (US)

(72) Inventors: Laura Castro-Schilo, Chapel Hill, NC (US); James Robert Koepfler, Raleigh, NC (US); Christopher Michael Gotwalt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/069,206

(22) Filed: Oct. 13, 2020

(65) Prior Publication Data

US 2021/0110289 A1    Apr. 15, 2021

Related U.S. Application Data

(60) Provisional application No. 62/914,716, filed on Oct. 14, 2019, provisional application No. 62/980,565, filed on Feb. 24, 2020.

(51) Int. Cl.
*G06F 7/60* (2006.01)
*G06N 7/00* (2006.01)
(Continued)

(52) U.S. Cl.
CPC ............ *G06N 7/00* (2013.01); *G06F 3/0482* (2013.01); *G06F 3/0483* (2013.01); *G06N 5/025* (2013.01);
(Continued)

(58) Field of Classification Search
CPC ...................................................... G06N 7/00
(Continued)

(56) References Cited

U.S. PATENT DOCUMENTS

| 2009/0164401 | A1* | 6/2009 | Jung | G06Q 30/02 706/45 |
| 2009/0276390 | A1* | 11/2009 | Watanabe | G06F 17/18 706/54 |

(Continued)

OTHER PUBLICATIONS

Gray, K. et al., "What is Structural Equation Modeling?," accesed from: https://www.kdnuggets.com/2017/03/structural-equation-modeling.html, Mar. 2017,6 pages.
(Continued)

*Primary Examiner* — Timothy A Mudrick
(74) *Attorney, Agent, or Firm* — The Law Office of Tiffany E. Monroe, LLC; Tiffany E. Monroe

(57) ABSTRACT

The computing device receives a first user input request to modify a structural equation model (SEM) in a graphical user interface. The modification of the SEM includes modifying one or more SEM path diagram elements. The computing device detects whether a first SEM path diagram element is modified responsive to the received first user input request. Based on the detection, the computing device determines whether the modification violates a first set of SEM rules, a second set of SEM rules, or one or more launch conditions prior to initiating execution of the SEM. Based on determining a violation of the SEM rules or the launch conditions or that there was not a violation, the computing device displays a graphical indicator for indicating a fatal error for the SEM modification, a warning error for the SEM modification, or a valid SEM modification.

30 Claims, 29 Drawing Sheets
(23 of 29 Drawing Sheet(s) Filed in Color)

(51) Int. Cl.
    *G06N 5/04*     (2006.01)
    *G06F 3/0482*     (2013.01)
    *G06F 3/0483*     (2013.01)
    *G06N 5/02*     (2006.01)

(52) U.S. Cl.
    CPC ... *G06N 5/045* (2013.01); *G06F 2203/04803* (2013.01)

(58) Field of Classification Search
    USPC .......................................................... 703/2
    See application file for complete search history.

(56) References Cited

U.S. PATENT DOCUMENTS

2014/0258197 A1*   9/2014   Davulcu ................. G06N 5/02 706/21
2019/0108196 A1*   4/2019   Hannula .............. G06K 9/6256

OTHER PUBLICATIONS

Wikipedia Foundation, Inc., "Structural Equation Modeling", accessed from: https://en.wikipedia.org/wiki/Structural_equation_modeling, Feb. 24, 2020, 11 pages.

Hox, J. et al., "An Introduction to Structural Equation Modeling", Family Science Review, Nov. 1999, pp. 354-373, vol. 11.

Rosseel, Y., "lavaan: An R Package for Structural Equation Modeling", Journal of Statistical Software, May 2012, 36 pages, vol. 48, Iss. 2, American Statistical Association.

Fan, Y, et al., "Applications of Structural Equation Modeling (SEM) in Ecological Studies: an updated review", Ecological Processes, (2016), 12 pages.

Yorgason, J., "Troubleshooting problems with SEM models that have "Heywood" cases such as negative variance parameters and non-positive definite covariance matrices", accessed from: https://brightspotcdn.byu.edu/ba/fd/65505714418ebf6c0ad09f579b60/working-with-difficult-errors-in-sem.pptx.

Narayanan, A., "A Review of Eight Software Packages for Structural Equation Modeling", The American Statistician, (2012), pp. 129-138, vol. 66, No. 2.

Statistical Solutions, "AMOS", accessed from: https://www.statisticssolutions.com/amos/, Feb. 24, 2020, 4 pages.

IBM, "IBM SPSS Amos—Overview—United States", accessed from: https://www.ibm.com/us-en/marketplace/structural-equation-modeling-sem, Feb. 24, 2020, 4 pages.

MPLUS, "Structural Equation Modeling", accessed from: www.statmodel.com/SEM.shtml, Feb. 24, 2020, 2 pages.

Statistical Solutions, "Structural Equation Modeling", accessed from: https://www.statisticssolutions.com/structural-equation-modeling/, Feb. 24, 2020, 8 pages.

* cited by examiner

GRAPHICAL INTERACTIVE MODEL SPECIFICATION GUIDELINES FOR STRUCTURAL EQUATION MODELING DESIGNS

CROSS REFERENCE TO RELATED APPLICATIONS

This application claims the benefit of priority under 35 U.S.C. § 119(e) to U.S. Provisional Patent Application No. 62/980,565 filed on Feb. 24, 2020, and to U.S. Provisional Patent Application No. 62/914,716 filed on Oct. 14, 2019, the entirety of each of which is hereby incorporated by reference herein.

TECHNICAL FIELD

The present disclosure relates generally to graphical user interfaces. More specifically, but not by way of limitation, this disclosure relates to graphical interactive model design and specification guidelines for building interactive models.

BACKGROUND

Graphical user interfaces (GUIs) can be used to specify and design complex models with a visual diagram, such as Structural Equation Models (SEMs), for computer algorithms and models that fit networks of constructs to various types of data. However, these GUIs may not provide feedback or identify actual design issues with the SEM and/or how it is built until the SEM is fully specified, designed and executed. Interactive GUI feedback and identification of SEM issues prior to fully specifying, designing and executing an estimable SEM is needed for designers of various experience levels.

SUMMARY

In an example embodiment, a computer-program product is tangibly embodied in a non-transitory machine-readable storage medium. The computer-program product includes instructions operable to cause a computing device to display a graphical indicator for indicating a fatal error for a Structural Equation Model (SEM) modification, a warning error for a SEM modification, or a valid SEM modification. The computing device receives a first user input request to modify a SEM in a graphical user interface. The modification of the SEM includes modifying one or more SEM path diagram elements. The SEM path diagram elements include graphical indicators for observed variables, latent variables, variance paths, covariance paths, regression paths, or loading paths. The computing device detects whether a first SEM path diagram element is modified responsive to the received first user input request. Based on the detection, the computing device determines whether the modification violates a first set of SEM rules, a second set of SEM rules, or one or more launch conditions prior to initiating execution of the SEM. Based on determining a violation of the first set of SEM rules prior to execution of the SEM, the computing device presents a first graphical error indicator for indicating a fatal error, and presents an indication of one or more of the rules in the first set of SEM rules that were violated to cause the fatal error. Based on determining a violation of the second set of SEM rules or the one or more launch conditions prior to execution of the SEM, the computing device presents a second graphical error indicator for indicating a warning error, and presents an indication of one or more of the rules in the second set of SEM rules or the one or more launch conditions that were violated to cause the warning error. Based on determining that there was not a violation prior to execution of the SEM, the computing device presents a first graphical indicator for indicating a valid SEM modification.

In an exemplary alternative embodiment, the computer-program product includes instructions operable to cause a computing device to receive a second user input request to modify the structural equation model (SEM) in the graphical user interface. The modification responsive to the second user input request includes selecting one or more SEM path diagram elements in the SEM other than the SEM path diagram elements modified responsive to the first user input request. The computing device detects whether the selected one or more SEM path diagram elements are modified responsive to the received second user input request. Based on the detection responsive to the received second user input request, the computing device determines whether the modification violates the first set of SEM rules, the second set of SEM rules, or the one or more launch conditions prior to execution of the SEM. Based on determining a violation of the first set of SEM rules prior to execution of the SEM, the computing device presents a third graphical error indicator for indicating a fatal error, and presents an indication of one or more of the rules in the first set of SEM rules that were violated to cause the fatal error. Based on determining a violation of the second set of SEM rules or the one or more launch conditions prior to execution of the SEM, the computing device presents a fourth graphical error indicator for indicating a warning error, and presents an indication of one or more of the rules in the second set of SEM rules or the one or more launch conditions that were violated to cause the warning error. Based on determining that there was not a violation prior to execution of the SEM, the computing device presents a second graphical indicator for indicating a valid SEM modification.

In another exemplary alternative embodiment, the computer-program product includes instructions operable to cause a computing device to receive a third user input request to execute the SEM after the presentation of the second graphical indicator for indicating a valid SEM modification. In response to receiving the third user input request, the computing device executes the SEM, and presents a result of the executed SEM in the graphical user interface.

In another exemplary alternative embodiment, the computer-program product includes a first set of graphical indicators for the one or more observed variables that has a name for each of the one or more observed variables.

In another exemplary alternative embodiment, the computer-program product includes a second set of graphical indicators that has a unidirectional arrow to indicate a regression path, a bidirectional arrow to indicate a covariance path, and a latent label to indicate a latent variable.

In another exemplary alternative embodiment, the computer-program product includes the first set of SEM rules that has a t-Rule, a sample size rule, and a latent scale set rule.

In another exemplary alternative embodiment, the computer-program product includes the second set of SEM rules that has a two-indicator rule, a three-indicator rule, a two emitted path rule, a no endogenous predictor rule, and a recursive rule.

In another exemplary alternative embodiment, the computer-program product includes the first graphical error indicator and the third graphical error indicator as a first color, the second graphical error indicator and the fourth graphical error indicator as a second color, and the first graphical indicator and the second graphical indicator as a third color.

In another exemplary alternative embodiment, the computer-program product displays the presentation of the first graphical error indicator, the second graphical error indicator, the third graphical error indicator, the fourth graphical error indicator, the first graphical indicator and the second graphical indicator in a second graphical user interface. The second graphical user interface shows the sets of SEM rules, model details and data details of the SEM.

In another exemplary alternative embodiment, the computer-program product includes instructions operable to cause a computing device to present a textual explanation of the violation of the one or more SEM rules or the one or more launch conditions in a second graphical user interface.

In another exemplary alternative embodiment, the computer-program product includes instructions operable to cause a computing device to determine whether the launch condition includes a non-positive definite sample covariance matrix prior to receiving the first user input request. Based upon determining there is the non-positive definite sample covariance matrix, the computing device presents the second graphical error indicator for indicating the warning error and presents the indication of the one or more launch conditions that were violated to cause the warning error. Based upon determining there is not the non-positive definite sample covariance matrix, the computing device determines whether there is a range between variances in the observed variables that exceeds a threshold. Based upon determining there is the range between variances in the observed variables that exceeds the threshold, the computing device presents the second graphical error indicator for indicating the warning error and presents the indication of the one or more launch conditions that were violated to cause the warning error.

In another exemplary alternative embodiment, the computer-program product includes instructions operable to cause a computing device to determine whether the SEM has at least one of a latent variable and a regression path after receiving the first user input request to modify the SEM. Based upon determining that the SEM has at least one of the latent variable and the regression paths, the computing device initiates a check of one or more of the rules in the sets of SEM rules, model details and data details of the SEM to determine whether the one or more of the rules in the sets of SEM rules were violated.

In another exemplary alternative embodiment, the computer-program product includes instructions operable to cause a computing device to present a first section of the graphical user interface for a user to select the graphical indicators for any of the observed variables, the latent variables, the variance paths, the covariance paths, the regression paths, or the loading paths. The computing device presents a second section of the graphical user interface for the user to move, add or remove any of the graphical indicators into a graphical workspace for constructing the SEM.

In another example embodiment, a method is provided to display a graphical indicator for indicating a fatal error for a Structural Equation Model (SEM) modification, a warning error for a SEM modification, or a valid SEM modification.

In yet another example embodiment, a computing device is provided. The computing device includes, but is not limited to, a processor and a memory. The memory contains instructions that when executed by the processor control the computing device to display a graphical indicator for indicating a fatal error for a Structural Equation Model (SEM) modification, a warning error for a SEM modification, or a valid SEM modification.

Other features and aspects of example embodiments are presented below in the Detailed Description when read in connection with the drawings presented with this application.

BRIEF DESCRIPTION OF THE DRAWINGS

The patent or application file contains at least one drawing executed in color.

The specification makes reference to the following appended figures, in which use of like reference numerals in different figures is intended to illustrate like or analogous components.

DETAILED DESCRIPTION

Figure 1:
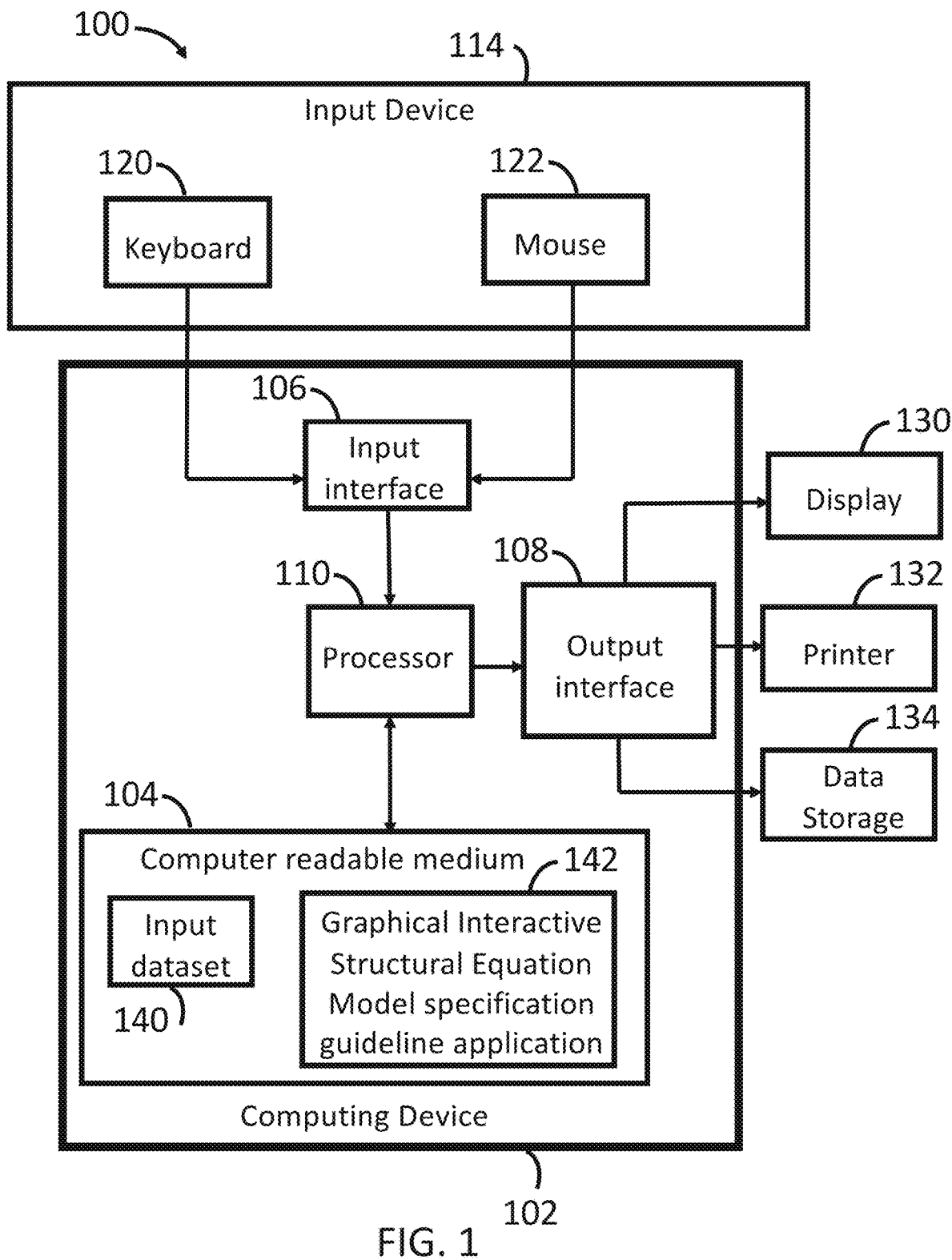
FIG. 1 is an example block diagram of a computer-implemented environment for modifying a structural equation model (SEM) in an interactive graphical user interface, according to certain aspects of the present disclosure.

An effective graphical user interface (GUI) for statistical modeling may require simple and intuitive options for specifying a variety of models, while still affording the capabilities of fitting even the most complex ones. Identifying elements that are needed by naïve and expert users alike can facilitate the GUI design task, as these can become easily accessible and visible options for the user/designer of the GUI. Further, a user's workflow should also be considered to ensure alignment of software inputs and outputs. For example, in a statistical model where multiple user inputs are required for specification, an equal amount of software outputs allows users to understand the consequences of their inputs. Software outputs should be easily noticeable and interpretable by users without being intrusive to their workflow. Moreover, an iterative process may be required between designer and diverse users, where the latter experience the GUI and reflect upon the challenges and successes encountered in the software tool.

Structural equation modeling enables users to specify a large variety of models from simple and multiple linear regressions to factor analysis and even multivariate conditional growth curves, for example. These models can be visually represented with a simplified graphical diagram instead of complicated systems of structural equations. Thus, diagrams provide an intuitive tool to enable model specification. However, diagrams also allow users to easily specify models that are not estimable for any number of reasons. There is a need for an interactive graphical user interface (GUI) that immediately alerts users of model specification issues by providing an indication and description of the problem while the model is being built. Thus, users can correct model specification issues and fit a correctly specified model prior to model execution.

Certain aspects and features of the present disclosure relate to graphical interactive model specification guidelines for structural equation modeling designs. For example, a computing device can detect that a user modified one or more path diagram elements of a structural equation model (SEM) in an interactive graphical user interface (GUI). Based on detecting the modification, the computing device can determine whether the modification violates SEM rules or launch conditions prior to executing/running the SEM. The computing device can then present a graphical indicator in the interactive GUI that indicates a valid or invalid modification. The computing device can also present an indication of which SEM rules or launch conditions were violated. This interactive, real-time graphical feedback saves users time as it is provided immediately upon making a SEM modification. The timely dynamic feedback also serves to inform users of the cause of the warning or error. Thus, users know the precise modification that led to the issue. This contrasts with conventional SEM software tools, where a warning or error due to model specification is only indicated after the SEM execution and without sufficient context and feedback as to what caused the problem, which can overly complicate and slow down the design process and the users' workflow. Indeed, the design guidelines outputted by the GUI described herein can serve both as a check on the user-specified model and a teaching tool for accurate SEM specifications for SEM designers of various experience levels.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is an example block diagram of a computer-implemented environment 100 for modifying a structural equation model in an interactive graphical user interface, according to certain aspects of the present disclosure. The computer-implemented environment 100 includes a computing device 102.

The computing device 102 has a computer-readable medium 104 and a processor 110. Computer-readable medium 104 is an electronic holding place or storage for information so the information can be accessed by processor 110. Computer-readable medium 104 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 110 executes instructions (e.g., stored at the computer readable medium 104). The instructions can be carried out by a special purpose computer, logic circuits, or hardware circuits. In one or more embodiments, processor 110 is implemented in hardware and/or firmware. Processor 110 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 110 in one or more embodiments can retrieve a set of instructions from a permanent memory device and copy the instructions in an executable form to a temporary memory device that is generally some form of RAM, for example. Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, thermal mitigation improvements, processing speed improvements, data communication speed improvements, and/or data efficiency targets and improvements throughout various parts of the system when compared to a homogeneous computing architecture that employs CPUs for general purpose computing.

In one or more embodiments computer-readable medium 104 stores instructions for execution by processor 110. For example, computer-readable medium 104 comprises an input dataset 140 and instructions for a graphical interactive structural equation model specification guideline application 142.

In one or more embodiments, the graphical interactive structural equation model specification guideline application 142 receives an input dataset 140 for one or more observed variables, utilizes the input dataset for the one or more observed variables to fit a user-specified structural equation model (SEM), and provides feedback for the user-specified SEM as the model is being constructed. The input dataset 140 can include data related to employee job satisfaction, energy and utility data, sensor data of physical environments, student academic achievement, online consumer data, manufacturing data, pharmaceutical data, human resources data, etc. For example, an SEM can include data from an employee survey that predicts employee job satisfaction based on company leadership and the ability of company leadership to resolve conflicts with employees. As the user specifies the SEM for predicting employee job satisfaction, the graphical interactive structural equation model specification guideline application can provide feedback on whether an estimable SEM for employee job satisfaction has been specified.

In one or more embodiments, one or more applications stored on computer-readable medium 104 are implemented in software (e.g., computer-readable and/or computer-executable instructions) stored in computer-readable medium 104 and accessible by processor 110 for execution of the instructions. The applications can be written using one or more programming languages, assembly languages, scripting languages, etc. The one or more applications can be integrated with other analytic tools. As an example, input dataset 140 and interactive structural equation model application 142 are integrated data analytics software application and/or software architecture such as that offered by SAS Institute Inc. of Cary, N.C., USA. Merely for illustration, the applications are implemented using or integrated with one or more SAS software tools such as JMP®, Base SAS, SAS® Enterprise Miner™ SAS/STAT®, SAS® High Performance Analytics Server, SAS® Visual Data Mining and Machine Learning, SAS® LASR™ SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA.

One or more applications stored on computer-readable medium 104 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 102. For instance, in one or more embodiments, computing device 102 further includes an input interface 106. Processor 110 operably couples with components of computing device 102 (e.g., input interface 106, with output interface 108 and with computer readable medium 104) to receive, to send, and to process information.

In one or more embodiments, the computing device 102 receives information from input device 114 via input interface 106. In one or more embodiments, the input device 114 is one or more devices for user entry (e.g. modify one or more path diagram elements of a structural equation model) into the computer-implemented environment 100. For instance, the input device 114 could include one or more of a mouse 122 or a keyboard 120. Alternatively or additionally, the input device 114 includes a display, a track ball, a keypad, a touchpad, one or more buttons, a sensor, a phone, a user selection mechanism, etc. For instance, a user inputs a modification to an element of a structural equation model (SEM) to the computing device 102 (e.g., using mouse 122 or keyboard 120).

The computing device 102 outputs information to a display 130, printer 132, or data storage 134 via output interface 108. Output interface 108 provides an interface for outputting information (e.g., graphical indicator for indicating a fatal error, warning error, or valid SEM modification) for review by a user.

Figure 2:
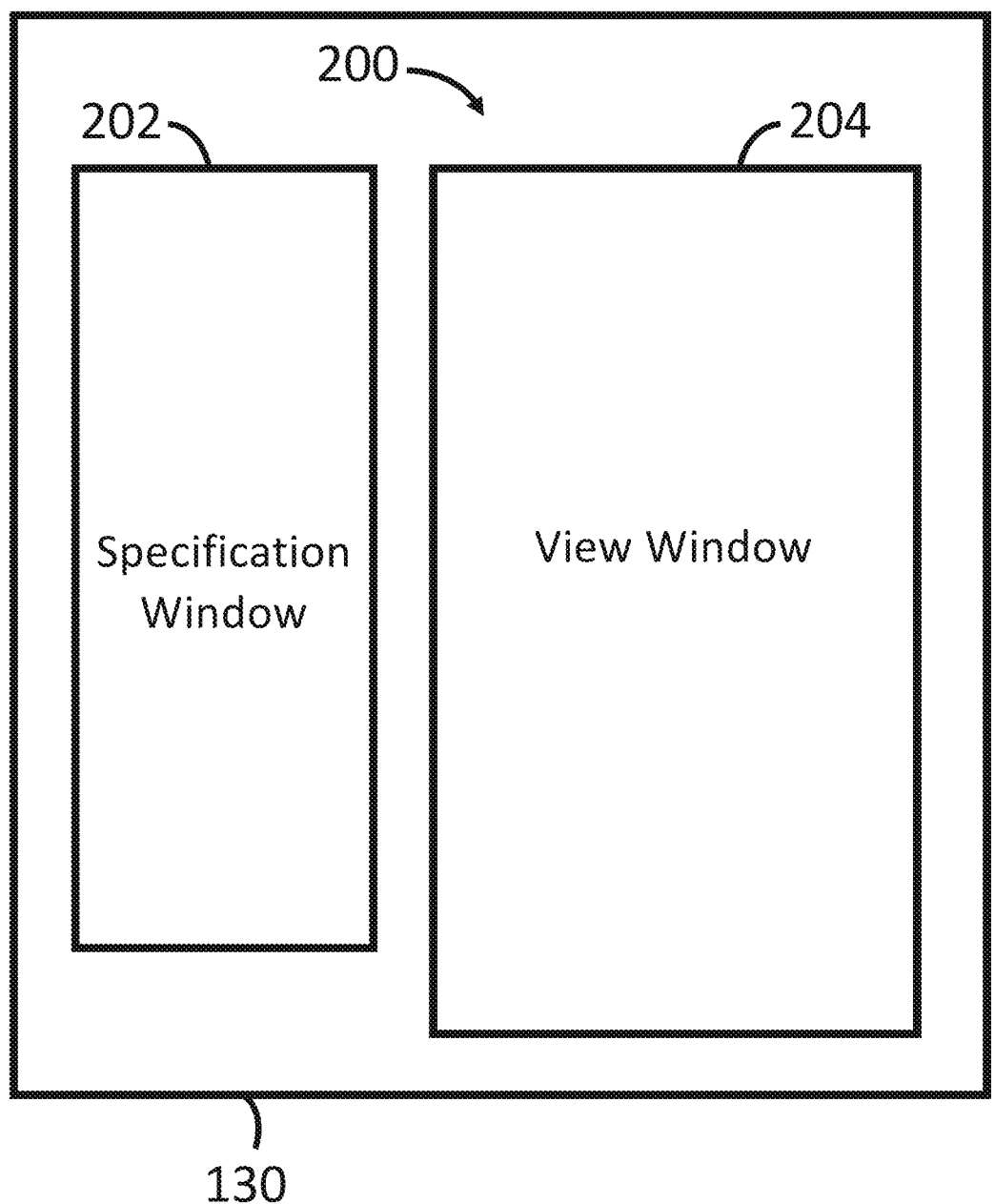
FIG. 2 is an example graphical user interface that is configured to be utilized for providing status indication prior to execution of an SEM, according to certain aspects of the present disclosure.

FIG. 2 is an example graphical user interface in which a user can modify a structural equation model (e.g., in the specification window 202) and view the status indications for the modifications to the structural equation model (e.g., in the view window 204). That is, the boxes or windows in FIG. 2 show the relative position of model specification and resulting status indication of an embodiment constructed in accordance with this disclosure. Details with respect to an embodiment are illustrated, for example, in FIG. 5A-5E, which is discussed further below. FIG. 2 shows a computer display 200 in a GUI environment of a computer that provides an example of a graphical user interface comprising graphical indicators for observed variables, latent variables, variance paths, covariance paths, regression paths, or loading paths (e.g., in the specification window 202) and graphical indicators for indicating a fatal error, warning error, or valid SEM modification (e.g., in the view window 204). The computer-implemented environment 100 (FIG. 1) includes a display 130 (FIG. 2) on which the user modifies one or more path diagram elements of the structural equation model (e.g., in the specification window 202) and the resulting status indications from the modifications of the structural equation model (e.g., in the view window 204). FIG. 2 shows that the embodiment provides a graphical display for the structural equation model, in accordance with this disclosure, with a specification window 202 on the left side of the display and a view window 204 on the right side of the display.

Figure 3:
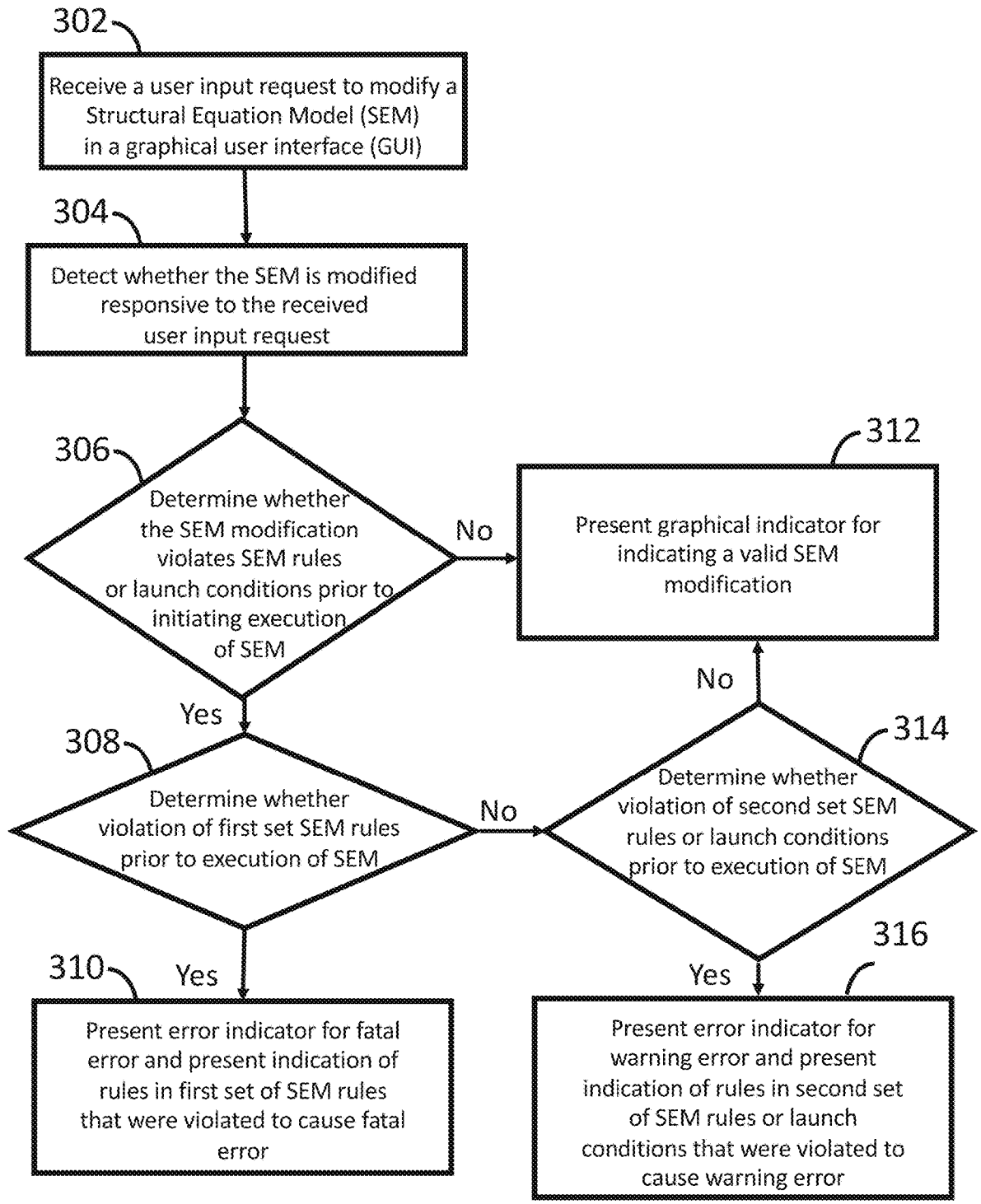
FIG. 3 is an example flow diagram for modifying an SEM in an interactive graphical user interface, according to certain aspects of the present disclosure.

FIG. 3 is an example flow diagram for modifying a structural equation model in an interactive graphical user interface, according to certain aspects of the present disclosure. In block 302, a computing device receives a user input request to modify a structural equation model (SEM) in an interactive graphical user interface (GUI). The user input request may comprise, for example, a user selection of graphical indicators for observed variables, latent variables, variance paths, covariance paths, regression paths, or loading paths via a mouse click in the specification window 202 (FIG. 2), an example of which is illustrated in the specification window 502 of FIG. 5A. While the user selection of graphical indicators is described as a mouse click, it is generally describing a selection mechanism to select an object in the GUI.

In block 304, the computing device detects whether the SEM is modified responsive to the received user input request. Examples of the SEM modifications can include selecting graphical indicators for observed variables in one or more lists (506, 508) and then selecting a graphical indicator to add a regression path for the observed variables 510, selecting graphical indicators for observed variables in one or more lists (606, 608) and then adding a covariance path for the observed variables 610, selecting graphical indicators for observed variables in one or more lists 708 and then adding a latent variable for the observed variables (710), or selecting graphical indicators for observed variables in one or more lists 808 and then adding one or more latent variables for the observed variables 810.

In block 306, the computing device determines whether the SEM modification violates SEM rules or launch conditions prior to initiating execution of SEM. The SEM rules may include a first set of SEM rules and a second set of SEM rules. The first set of SEM rules may include a t-Rule, a sample size rule, and a latent scale set rule. Respectively, these rules check for enough information in the data with respect to the unknown parameters in the model, enough data to obtain stable parameter estimates, an arbitrary scale required to define the metric of a variable that is latent or not directly observed, and enough information to model a latent variable. The second set of SEM rules may include a two-indicator rule, a three-indicator rule, a two emitted path rule, a no endogenous predictor rule, and a recursive rule. In the order listed, these rules check for appropriate definition of latent variables that rely on only two observed variables (e.g., covariance with at least another latent variable), a minimum of three observed variables for creating latent variables, a minimum of two effects (loading or regressions) originating from a latent variable to other variables, a lack of variables that are both an outcome and a predictor, and a lack of feedback loops in the path diagram. There are also launch conditions that should be met to permit appropriate estimation of the SEM. The launch conditions may include a non-positive definite sample covariance matrix, as an invertible variance-covariance matrix is required to obtain SEM estimates, or a range between variable variances that exceeds a threshold, as a large range in variances often produces Hessian matrices that are ill-conditioned. Failure to meet these launch conditions often produces unstable margins of error for statistics.

If the computing device determines that the SEM modification does not violate the SEM rules or launch conditions prior to initiating execution of SEM, the interactive graphical user interface may present a graphical indicator for indicating a valid SEM modification as shown in block 312. The graphical indicator may include a color and/or symbol. For example, the color may include green, yellow, orange, etc., and the symbol may include a checkmark symbol, an "L" symbol, an "X" symbol, etc. Once the graphical indicator for indicating a valid SEM modification is presented, the computing device may receive a user input request to execute the SEM. The computing device may then execute the SEM. The interactive graphical user interface may present a result of the executed SEM.

If the computing device determines that the SEM modification does violate the SEM rules or launch conditions prior to initiating execution of SEM, the computing device will determine whether the SEM modification violates the first set of SEM rules (as shown in block 308), the second set of SEM rules (as shown in block 314), or the launch conditions (as shown in block 314). The interactive graphical user interface may present a graphical error indicator for a fatal error and an indication of which of the rules in the first set of SEM rules were violated to cause the fatal error as shown in block 310. Thus, failure of the t-Rule, the sample size rule, and/or the latent scale set rule produces a fatal error. The interactive graphical user interface may also present a graphical error indicator for a warning error and an indication of which of the launch conditions or rules in the second set of SEM rules were violated to cause the warning error as shown in block 316. Thus, a failure of the two-indicator rule, the three-indicator rule, the two emitted path rule, the no endogenous predictor rule, and/or the recursive rule in the second set of SEM rules, or in the launch conditions (e.g., the non-positive definite sample covariance matrix launch condition or the range between variable variances that exceeds a threshold launch condition), produces the warning error. The indication of which rules in the first set of SEM rules or second set of SEM rules were violated or the indication of which launch conditions were violated may be presented as a textual explanation. The graphical error indicator may include a color and/or symbol.

Figure 4A:
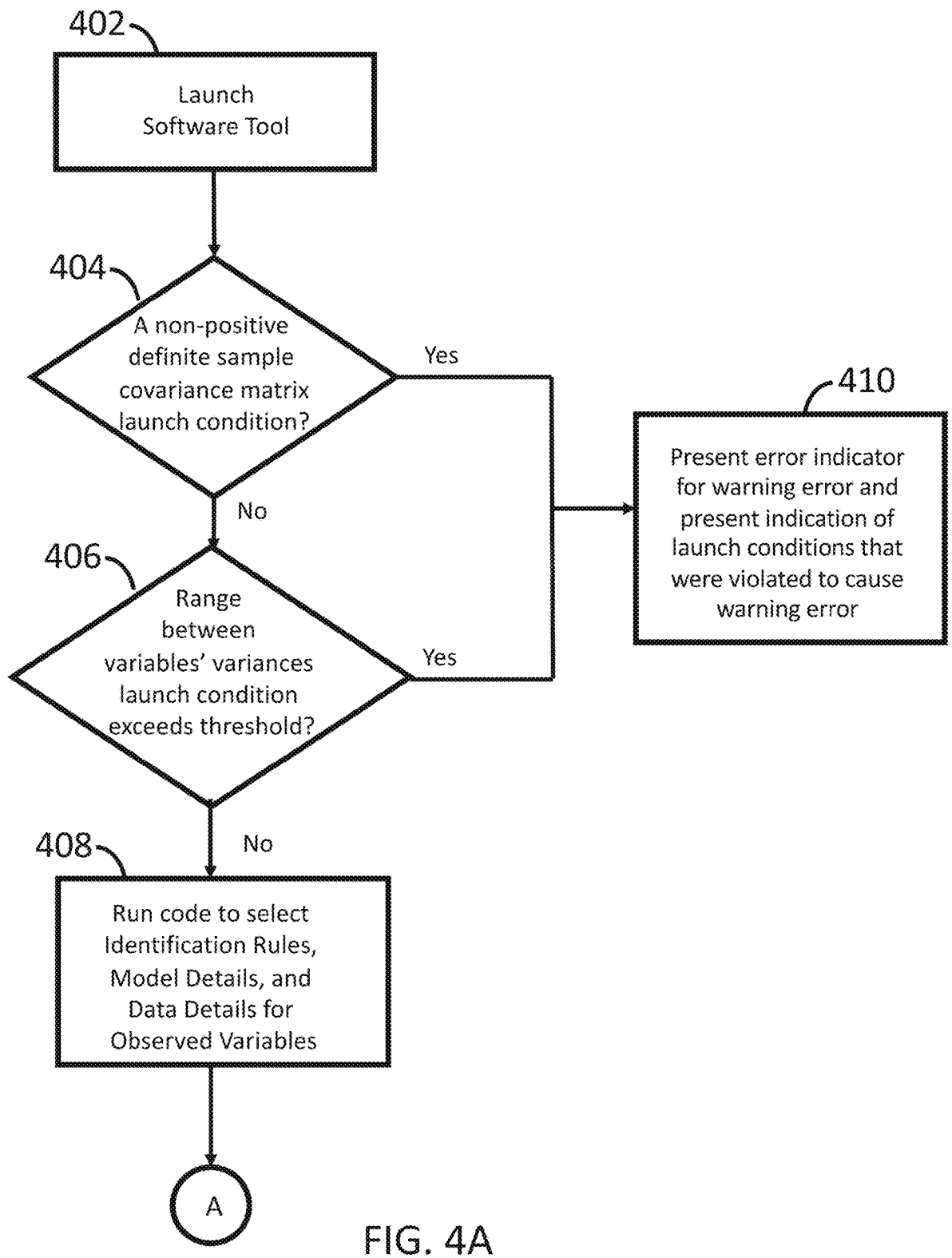
FIGS. 4A, 4B, and 4C are example flow diagrams for launching and modifying an SEM in an interactive graphical user interface, according to certain aspects of the present disclosure.
Figure 4B:
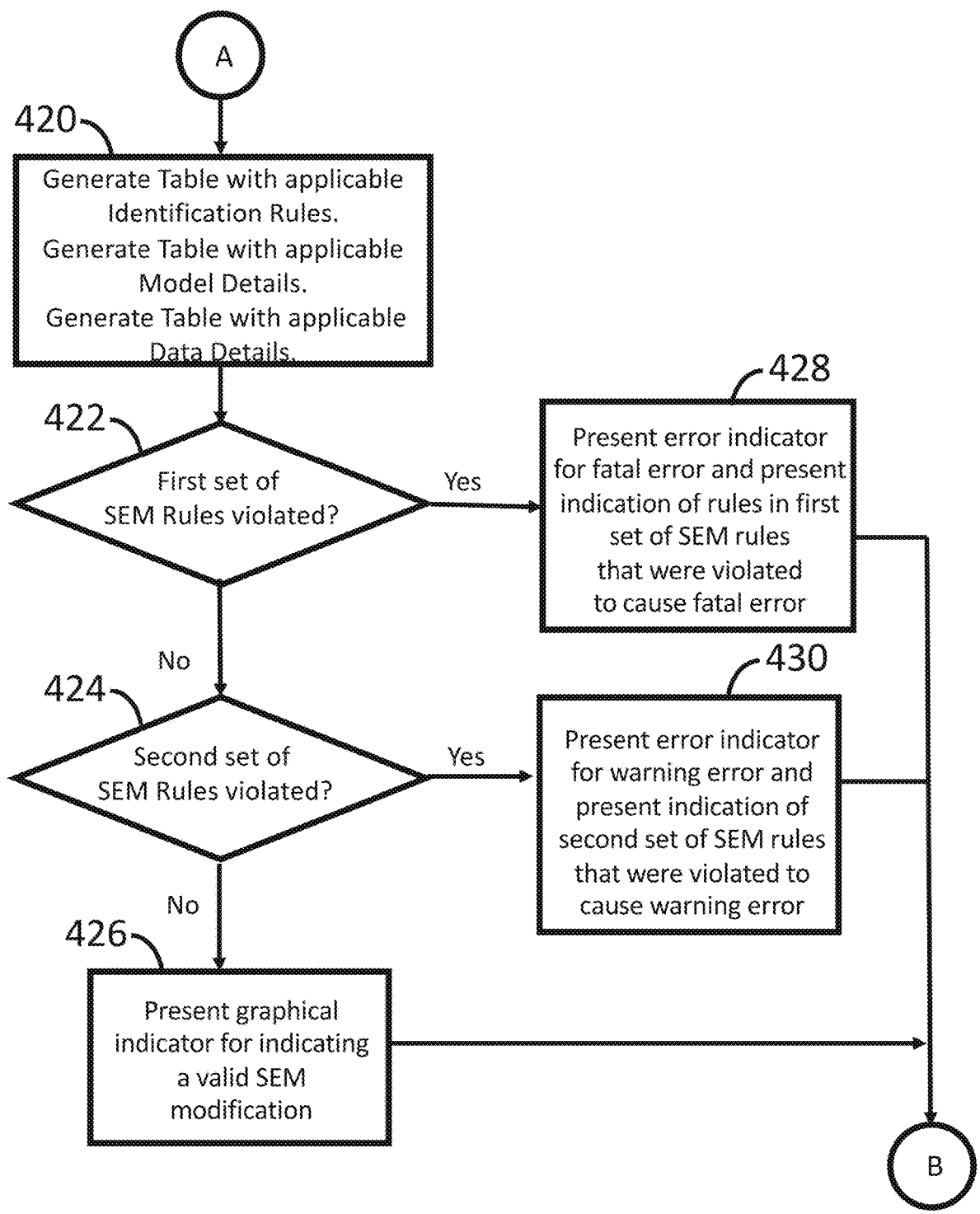
Figure 4C:
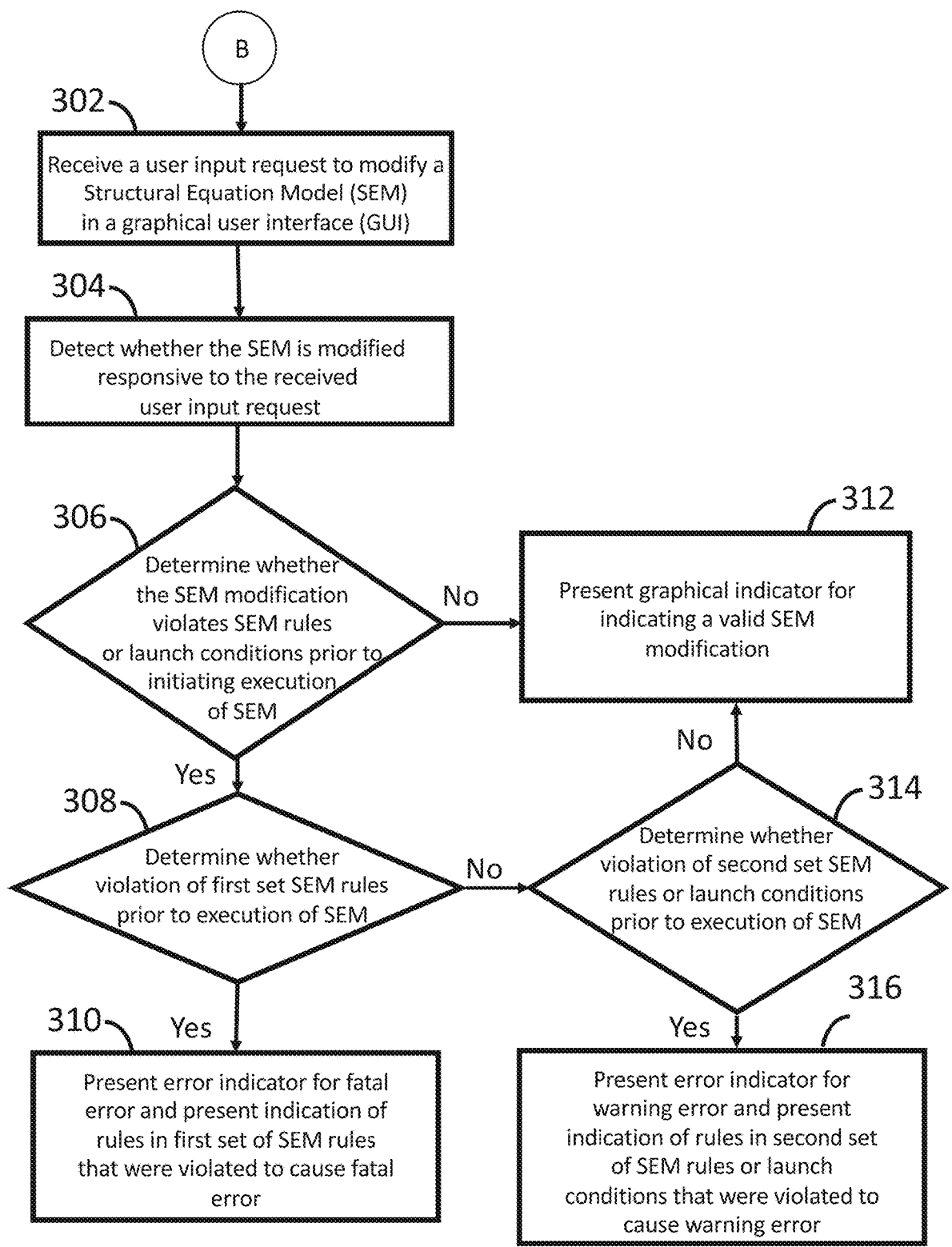

FIGS. 4A, 4B, and 4C are example flow diagrams for launching and modifying a structural equation model in an interactive graphical user interface, according to certain aspects of the present disclosure.

In block 402 of FIG. 4A, the computing device launches a software tool. For example, the computing device may receive a user input request to select graphical indicators for observed variables via a mouse click or a keyboard to include in a structural equation model. The computing device may also receive a second user input request to launch the software tool once the observed variables are selected for the structural equation model.

Once the computing device launches the software tool, the computing device may determine whether a non-positive definite (NPD) sample covariance matrix (shown in block 404) is present. An NPD matrix immediately suggests potential issues downstream because SEM requires invertible matrices. Moreover, the NPD could be the result of inadvertently launching the software tool with a redundant variable for analysis. If the non-positive definite sample covariance matrix is not present, the computing device may determine whether a range between variable variances exceeds a threshold. Large ranges across variables' variances also suggest potential issues with estimation of the model. Specifically, the matrix of second derivatives can be largely unstable, and thus, users are advised to rescale the variables if possible. If the range between variable variances does not exceed a threshold, the computing device runs code to select identification rules by searching for the presence or absence of latent variables and regression paths, displays model details by counting the number of paths for each type of effect and degrees of freedom in the model, and lists data details such as counts of missing values, for the observed variables included in the structural equation model.

If the non-positive definite sample covariance matrix is present and if the range between variable variances exceeds a threshold, the interactive graphical user interface may present a graphical error indicator for a warning error and an indication of which of the launch conditions were violated to cause the warning error as shown in block 410 of FIG. 4A. The indication may include a textual explanation of the launch conditions that were violated. The graphical error indicator may include a color and/or symbol.

In block 420 of FIG. 4B, the interactive graphical user interface may generate one or more tables that includes the identification rules, the model details and the data details for the observed variables included in the structural equation model.

In block 422, the computing device determines whether one or more of the first set of SEM rules is violated for the observed variables included in the structural equation model.

If one or more of the first set of SEM rules is violated for the observed variables included in the structural equation model, the interactive graphical user interface may present a graphical error indicator for a fatal error and an indication of which of the rules in the first set of SEM rules were violated to cause the fatal error as shown in block 428. The computing device may receive a user input request to modify the structural equation model (SEM) in the interactive graphical user interface (GUI) to overcome the fatal error caused by the violation of one or more of the first set of SEM rules as shown in block 302 of FIG. 4C and FIG. 3.

If one or more of the first set of SEM rules is not violated, the computing device determines whether one or more of the second set of SEM rules is violated for the observed variables included in the structural equation model. If one or more of the second set of SEM rules is violated, the interactive graphical user interface may present a graphical error indicator for a warning error and an indication of which of the rules in the second set of SEM rules were violated to cause the warning error as shown in block 430. The computing device may receive a user input request to modify the structural equation model (SEM) in the interactive graphical user interface (GUI) to overcome the warning error caused by the violation of one or more of the second set of SEM rules as shown in block 302 of FIG. 4C and FIG. 3. These rules are not tested interactively in conventional software for fitting SEMs. In conventional SEM software tools, users are tasked with both having actual knowledge of the rules and accessing the rules manually on their own. Conventional SEM software tools are not dynamic and do not provide visual feedback in real time as the user is actively designing the model. Moreover, the rules are only used to assess identification of the statistical model and have not been applied in a visual manner in software to guide proper specification of SEMs.

If one or more of the second set of SEM rules is not violated, the interactive graphical user interface may present a graphical indicator for indicating a valid SEM modification as shown in block 426. The graphical indicator may include a color and/or symbol. Once the graphical indicator for indicating a valid SEM modification is presented, the computing device may receive a user input request to modify the SEM or execute the SEM.

If the computing device receives the user input request to modify the SEM, the computing device may repeat the steps shown in FIGS. 3 and 4C.

Figure 9A:
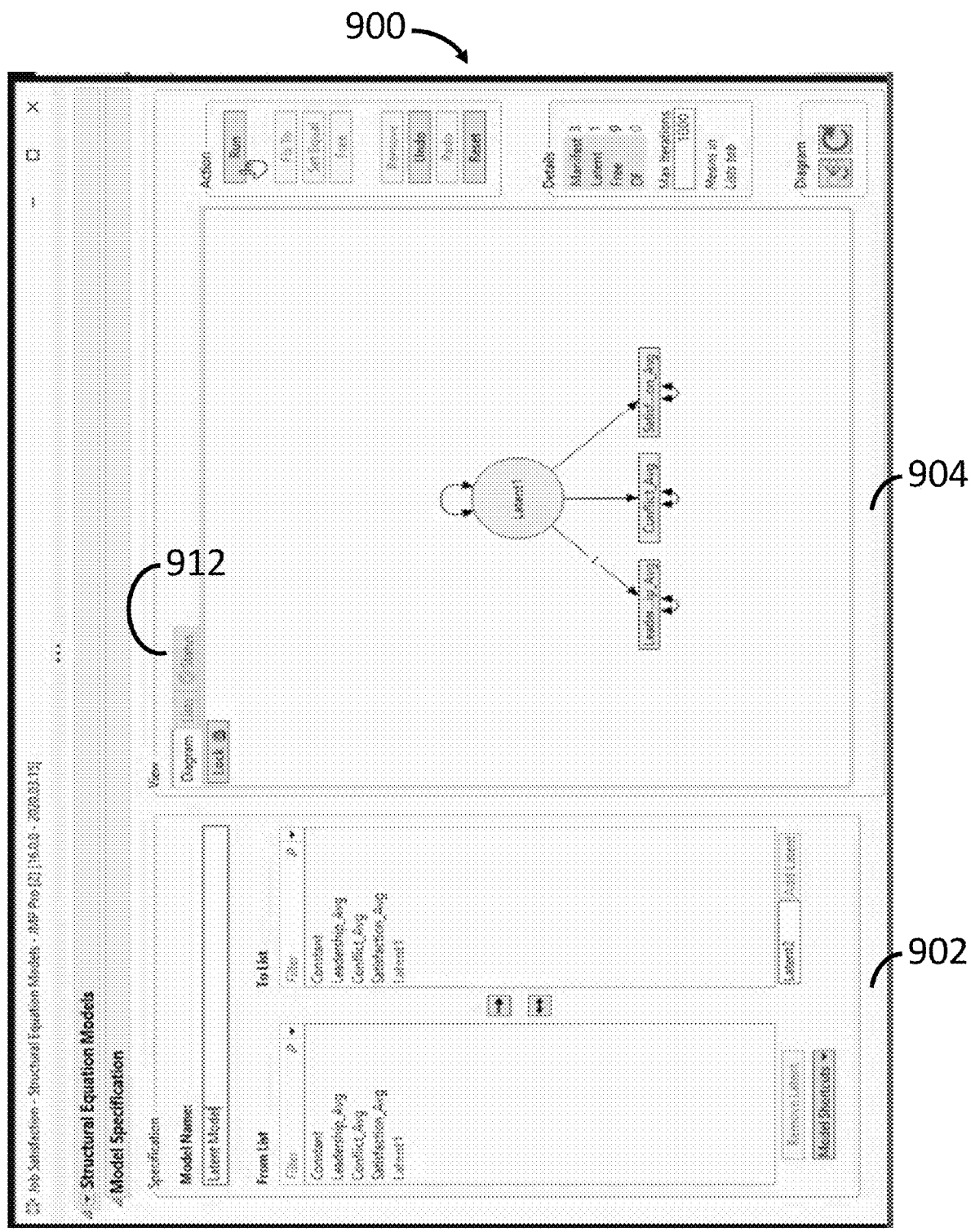
FIG. 9A is an example interactive graphical user interface for executing an SEM, according to certain aspects of the present disclosure.
Figure 9B:
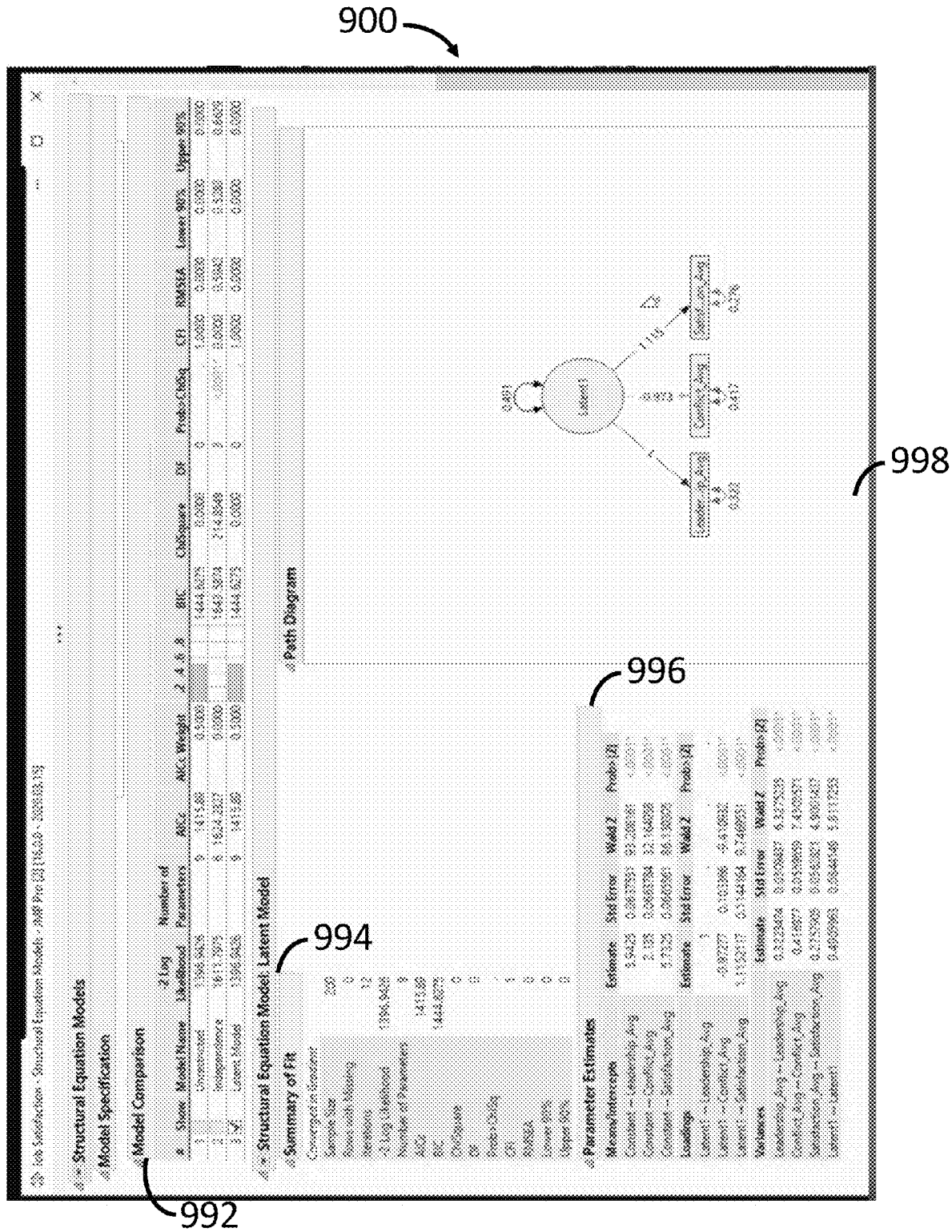
FIG. 9B is an example interactive graphical user interface for displaying result of executed SEM, according to certain aspects of the present disclosure.

If the computing device receives the user input request to execute the SEM as shown in FIG. 9A, the interactive graphical user interface may present a result of the executed SEM as shown in FIG. 9B.

Figure 5A:
FIG. 5A is an example interactive graphical user interface for specifying a regression path for an SEM and displaying the status indication of a regression path SEM modification, according to certain aspects of the present disclosure.

FIG. 5A is an example interactive graphical user interface (GUI) 500 for specifying a regression path for an SEM and displaying the status indication of a regression path SEM modification, in accordance with the template that is illustrated in FIG. 3. The GUI 500 shows a specification window 502 at the left side of the GUI and shows a view window 504 on the right side of the GUI. The specification window 502 shows a user selection of graphical indicators (506, 508) for one or more observed variables in one or more lists to be included in the SEM. The graphical indicators for the one or more observed variables includes a name for each of the one or more observed variables. The specification window 502 also shows a user selection of a graphical indicator 510 for a regression path. The graphical indicator for the regression path may include a unidirectional arrow. For example, the user can select the names of two observed variables 506 in the "From" list and the name of one observed variable 508 in the "To" list. The user can then select the unidirectional arrow 510 to determine the regression path between the two observed variables in the "From" list and the one observed variable in the "To" list for the SEM. The view window 504 shows the status indication of the SEM. The status indication can include a color and/or symbol. For example, the GUI displays a checkmark symbol with a green color 512 as the status indication for the SEM.

Figure 5B:
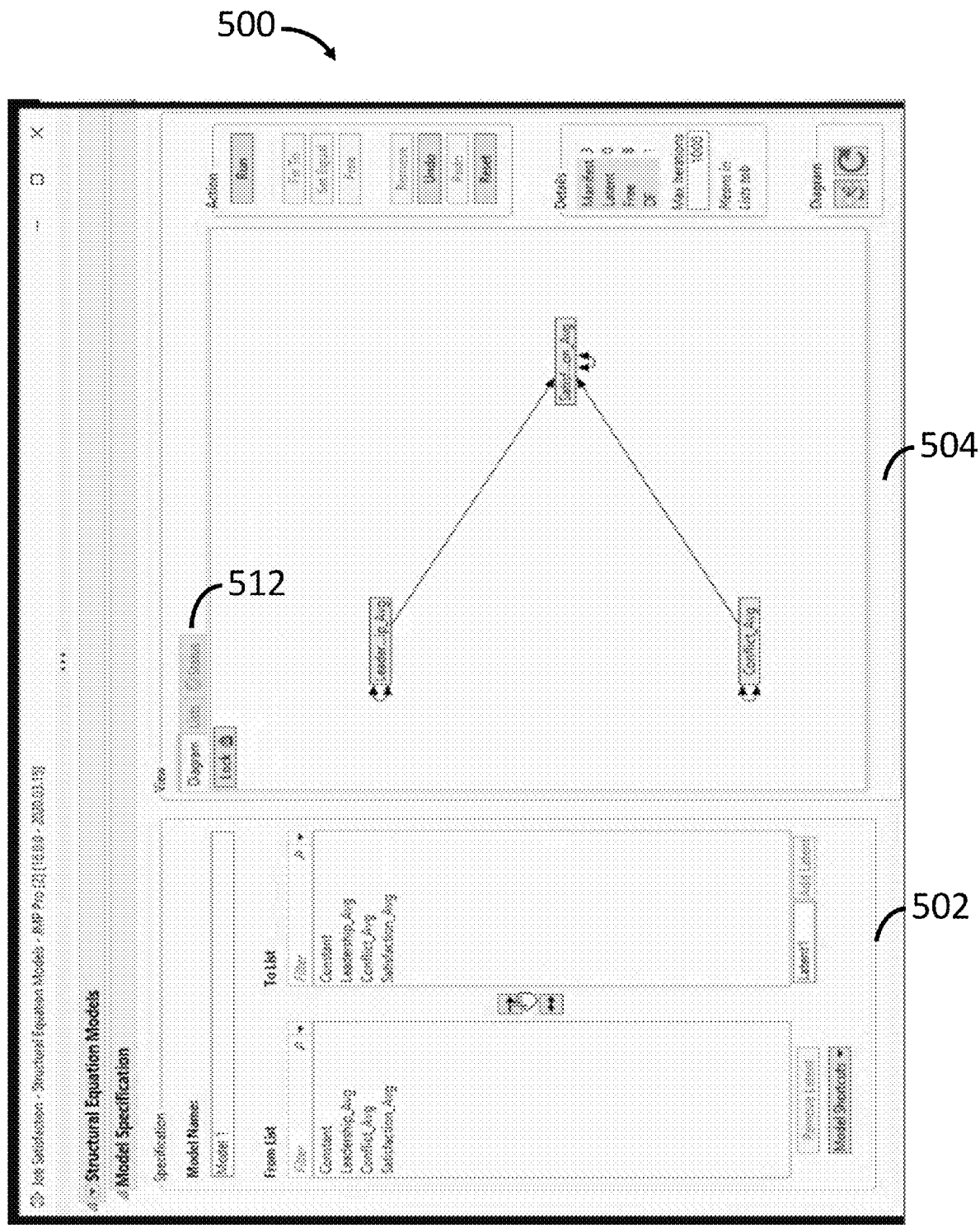
FIG. 5B is an example interactive graphical user interface for displaying the regression path diagram and the status indication for the regression path SEM modification, according to certain aspects of the present disclosure.

FIG. 5B is an example interactive graphical user interface 500 for displaying the regression path diagram and the status indication for the regression path SEM modification, in accordance with the template that is illustrated in FIG. 3. The GUI 500 shows a specification window 502 at the left side of the GUI and shows a view window 504 on the right side of the GUI. The view window 504 shows the SEM path diagram that results from the user selections of the graphical indicators for the observed variables and regression path in the specification window 502. The view window 504 also shows the status indication of the SEM. The status indication can include a color and/or symbol. For example, the GUI displays a checkmark symbol with a green color 512 as the status indication for the SEM, which denotes a valid SEM modification.

Figure 5C:
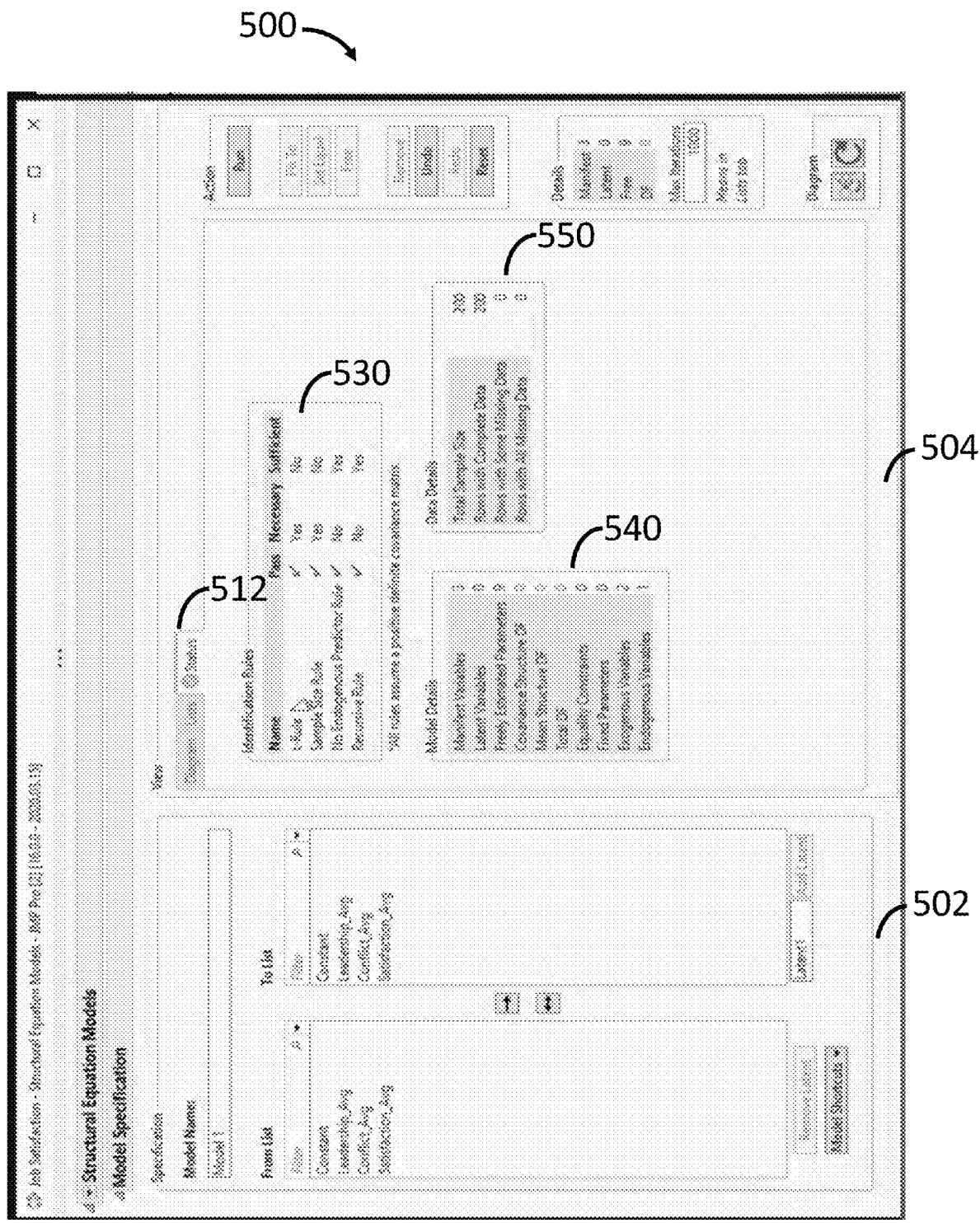
FIG. 5C is an example interactive graphical user interface for displaying status indication for a valid regression path SEM modification, according to certain aspects of the present disclosure.

FIG. 5C is an example interactive graphical user interface for displaying status indication for a valid regression path SEM modification, in accordance with the template that is illustrated in FIG. 3. The GUI 500 shows a specification window 502 at the left side of the GUI and shows a view window 504 on the right side of the GUI. A user may select a "Status" tab or indication 512 in the view window 504 to review a status indication of the identification rules, model details, and data details associated with the specified SEM. For example, the "Status" tab or indication 512 in the view window 504 shows that the identification rules table 530 associated with the regression path SEM modification includes the t-Rule, the sample size rule, the no endogenous predictor rule, and the recursive rule and that each of these four rules passes. The status for each of these four rules may be indicated by a green checkmark symbol, a red "X" symbol, etc. The t-Rule may pass if mean structure degrees of freedom or covariance structure degrees of freedom are zero or more. The model details table 540 shows that the mean structure degrees of freedom and the covariance structure degrees of freedom are zero. The sample size rule may pass if the total number of observations in the data are one or more than the number of freely estimated parameters in the model. The data details table 550 shows that the total number of observations (the total sample size is "200") in the data are one or more than the number of freely estimated parameters (the model details table 540 shows the number of freely estimated parameters is "9") in the model. The no endogenous predictor rule and recursive rule do not apply to the SEM when only latent variables are present without regression paths among them. The no endogenous predictor rule may pass if endogenous variables do not predict other variables and is only displayed when it passes because its failure does not indicate a specification error. The recursive rule may pass, for example, if no direct feedback loops exist in the model and no residual variances of endogenous variables covary with one of its predictor's residual variance. As indicated in this example, the SEM is guaranteed to be identified when the "Sufficient" column of the identification rules table lists "Yes" for a corresponding rule that has passed.

Figure 5D:
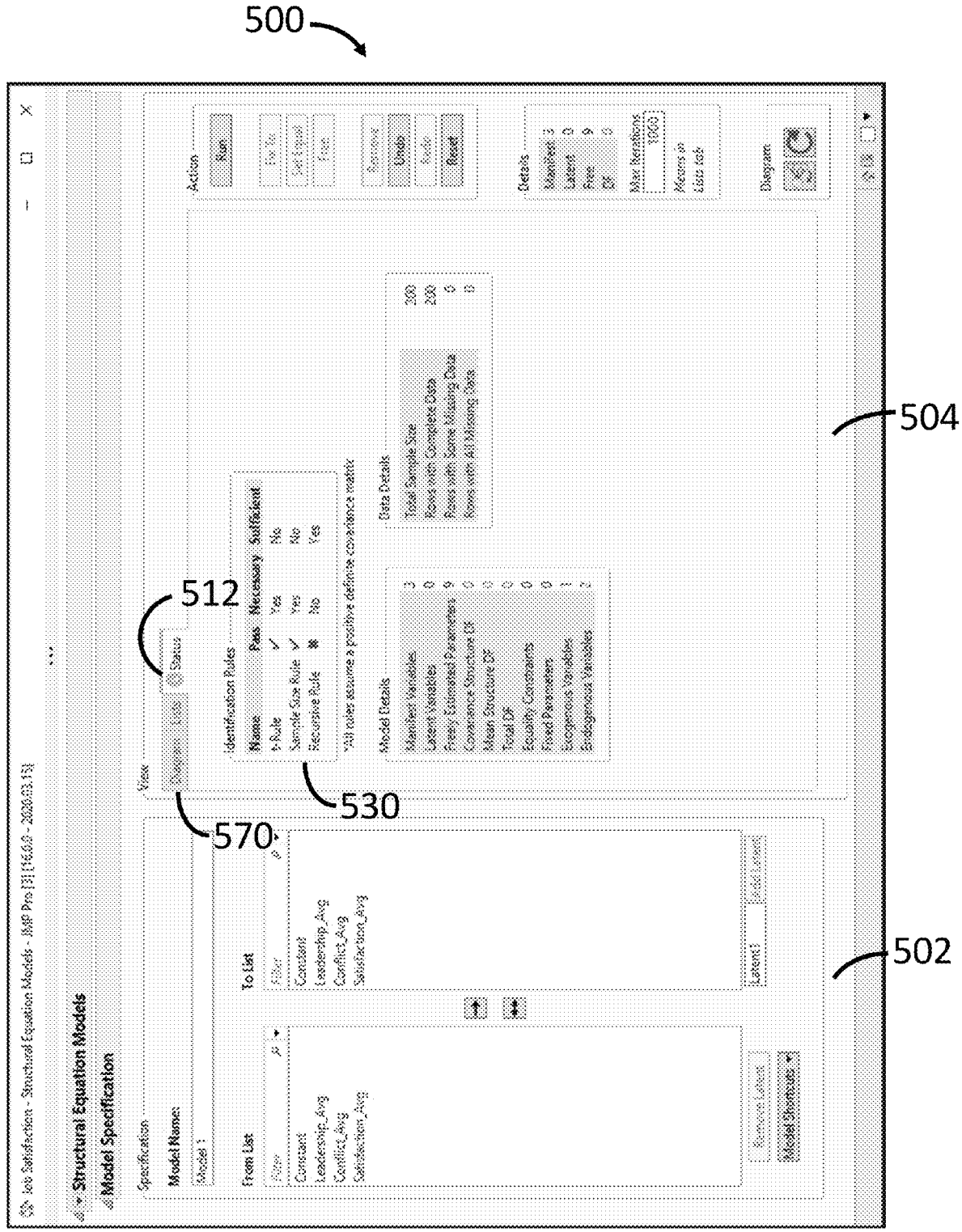
FIG. 5D is an example interactive graphical user interface for displaying a warning error status indication for a regression path SEM modification, according to certain aspects of the present disclosure.

FIG. 5D is an example interactive graphical user interface for displaying a warning error status indication for a regression path SEM modification, in accordance with the template that is illustrated in FIG. 3. The GUI 500 shows a specification window 502 at the left side of the GUI and shows a view window 504 on the right side of the GUI. A user may select a "Status" tab or indication 512 in the view window 504 to review a status indication of the identification rules, model details, and data details associated with the specified SEM. For example, the "Status" tab or indication 512 in the view window 504 shows that the identification rules table 530 associated with the regression path SEM modification includes the t-Rule, the sample size rule, and the recursive rule. The t-Rule and sample size rule pass as indicated in the description for FIG. 5C. The recursive rule fails as indicated by the red "X" symbol. The recursive rule may fail, for example, if direct feedback loops exist in the model and residual variances of endogenous variables covary with one of its predictor's residual variances. The user may select the failed recursive rule in the identification rules table 530 to show a textual explanation of the violation that caused the rule to fail. Based on the textual explanation of the violation, the user may select a "Diagram" tab or indication 570 in the view window to return to the SEM path diagram for the regression path SEM modification. The user may move, add, or remove any graphical indicators from/to the SEM path diagram in the specification window 502 or view window 504 for modifying the SEM. For example, the user may select "Undo" or "Reset" in the view window 504 to modify the SEM path diagram.

Figure 5E:
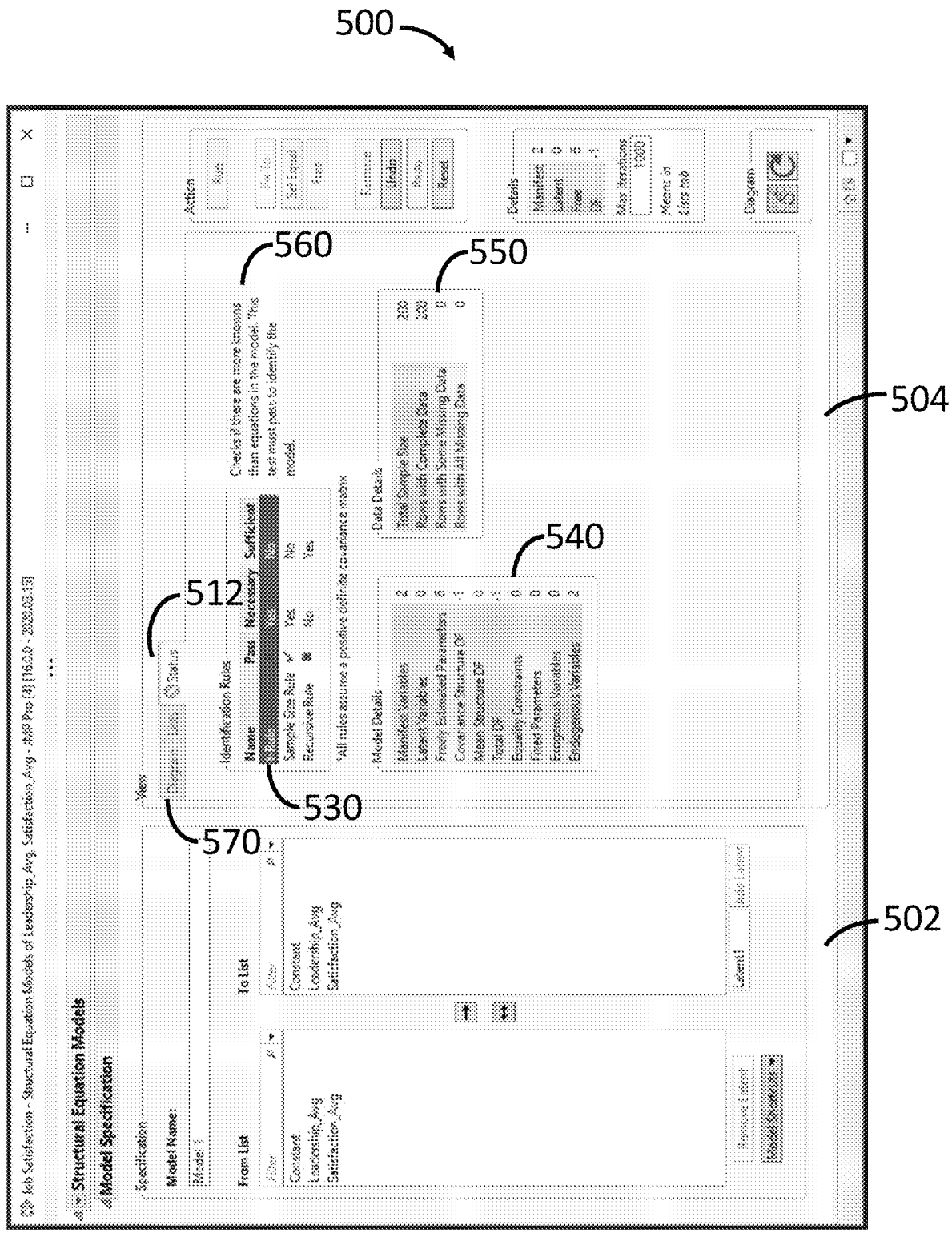
FIG. 5E is an example interactive graphical user interface for displaying a fatal error status indication for a regression path SEM modification, according to certain aspects of the present disclosure.

FIG. 5E is an example interactive graphical user interface for displaying a fatal error status indication for a regression path SEM modification, in accordance with the template that is illustrated in FIG. 3. The GUI 500 shows a specification window 502 at the left side of the GUI and shows a view window 504 on the right side of the GUI. A user may select a "Status" tab or indication 512 in the view window 504 to review a status indication of the identification rules, model details, and data details associated with the specified SEM. For example, the "Status" tab or indication 512 in the view window 504 shows that the identification rules table 530 associated with the regression path SEM modification includes the t-Rule, the sample size rule, and the recursive rule. The t-Rule and the recursive rule fail as indicated by the red "X" symbol. The t-Rule fails if mean structure degrees of freedom or covariance structure degrees of freedom are less than zero. The model details table 540 shows that the covariance structure degrees of freedom are "−1". The recursive rule may fail, for example, if direct feedback loops exist in the model and residual variances of endogenous variables covary with one of its predictor's residual variances. The sample size rule passes as indicated by the green checkmark symbol. The user may select, for example, the t-Rule, in the identification rules table 530 to show a textual explanation 560 of the violation that caused the t-Rule to fail. Based on the textual explanation of the violation, the user may select a "Diagram" tab or indication 570 in the view window 504 to return to the SEM path diagram for the regression path SEM modification. The user may move, add, or remove any graphical indicators from/to the SEM path diagram in the specification window 502 or view window 504 for modifying the SEM.

Figure 6A:
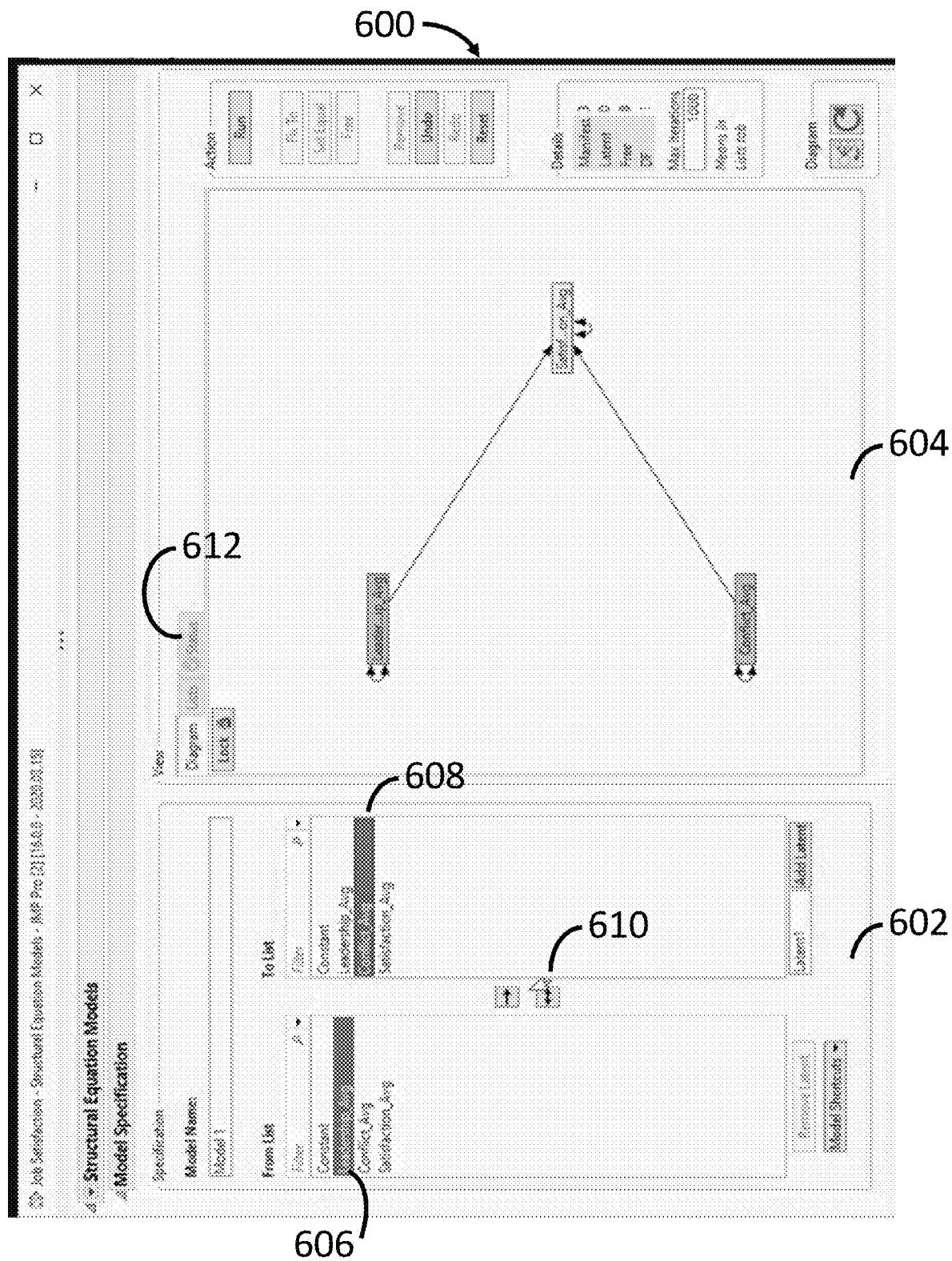
FIG. 6A is an example interactive graphical user interface for specifying a covariance path for an SEM and displaying the status indication of a covariance path SEM modification, according to certain aspects of the present disclosure.

FIG. 6A is an example interactive graphical user interface for specifying a covariance path for an SEM and displaying the status indication of a covariance path SEM modification, in accordance with the template that is illustrated in FIG. 3. The GUI 600 shows a specification window 602 at the left side of the GUI and shows a view window 604 on the right side of the GUI. The specification window 602 shows a user selection of graphical indicators (606, 608) for one or more observed variables in one or more lists to be included in the SEM. The graphical indicators for the one or more observed variables includes a name for each of the one or more observed variables. The specification window 602 also shows a user selection of a graphical indicator 610 for a covariance path. The graphical indicator for the covariance path may include a bidirectional arrow. For example, the user can select the names of one observed variable in the "From" list and the name of one observed variable in the "To" list. The user can then select the bidirectional arrow to determine the covariance path between the one observed variable in the "From" list and the one observed variable in the "To" list for the SEM. The view window 604 shows the status indication 612 of the SEM. The status indication can include a color and/or symbol. For example, the GUI displays a checkmark symbol with a green color as the status indication for the SEM.

Figure 6B:
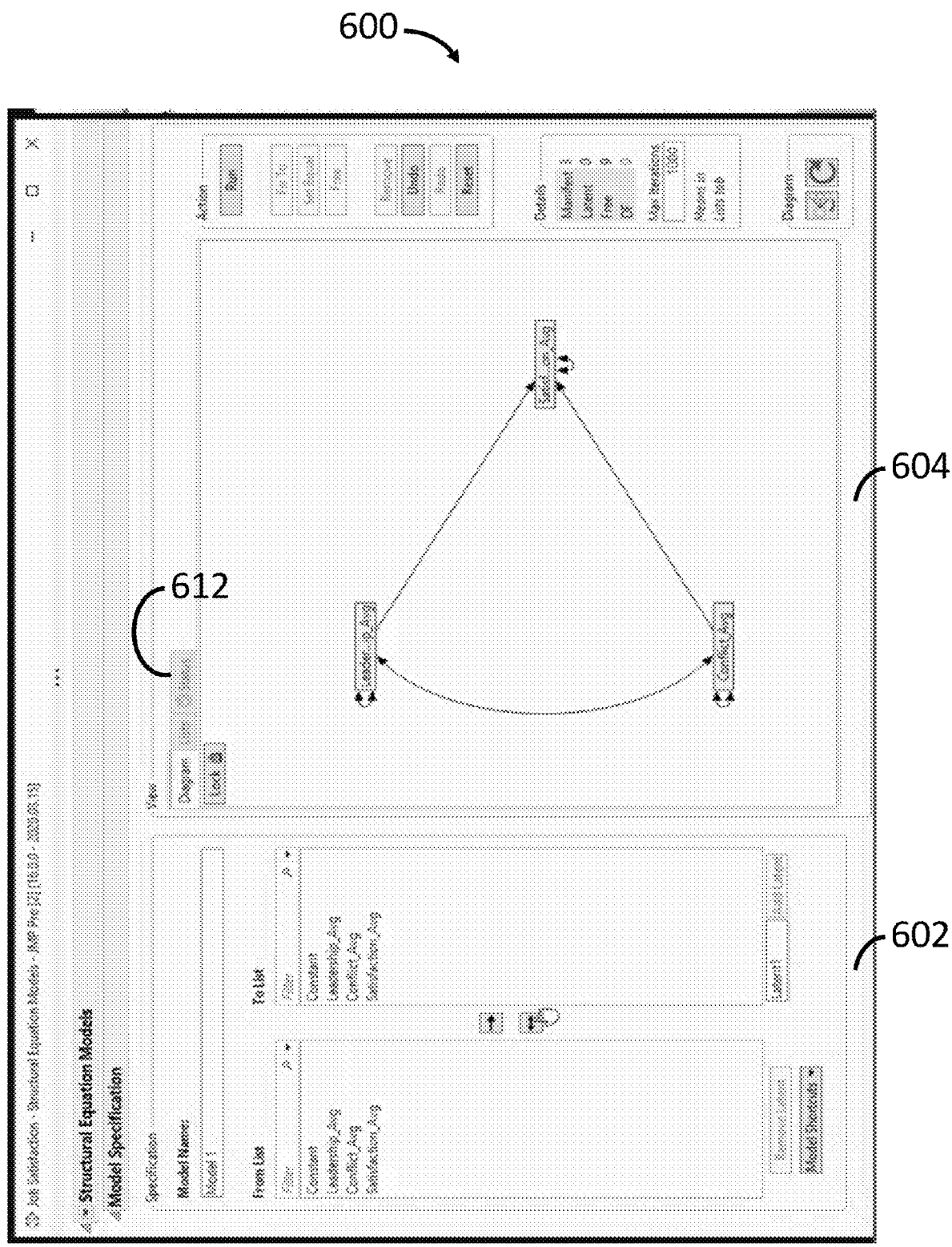
FIG. 6B is an example interactive graphical user interface for displaying the covariance path diagram and the status indication for the covariance path SEM modification, according to certain aspects of the present disclosure.

FIG. 6B is an example interactive graphical user interface for displaying the covariance path diagram and the status indication for the covariance path SEM modification, in accordance with the template that is illustrated in FIG. 3. The GUI 600 shows a specification window 602 at the left side of the GUI and shows a view window 604 on the right side of the GUI. The view window 604 shows the SEM path diagram that results from the user selections of the graphical indicators for the observed variables and covariance path in the specification window 602. The view window 604 also shows the status indication 612 of the SEM. The status indication can include a color and/or symbol. For example, the GUI displays a checkmark symbol with a green color as the status indication for the SEM, which denotes a valid SEM modification.

Figure 6C:
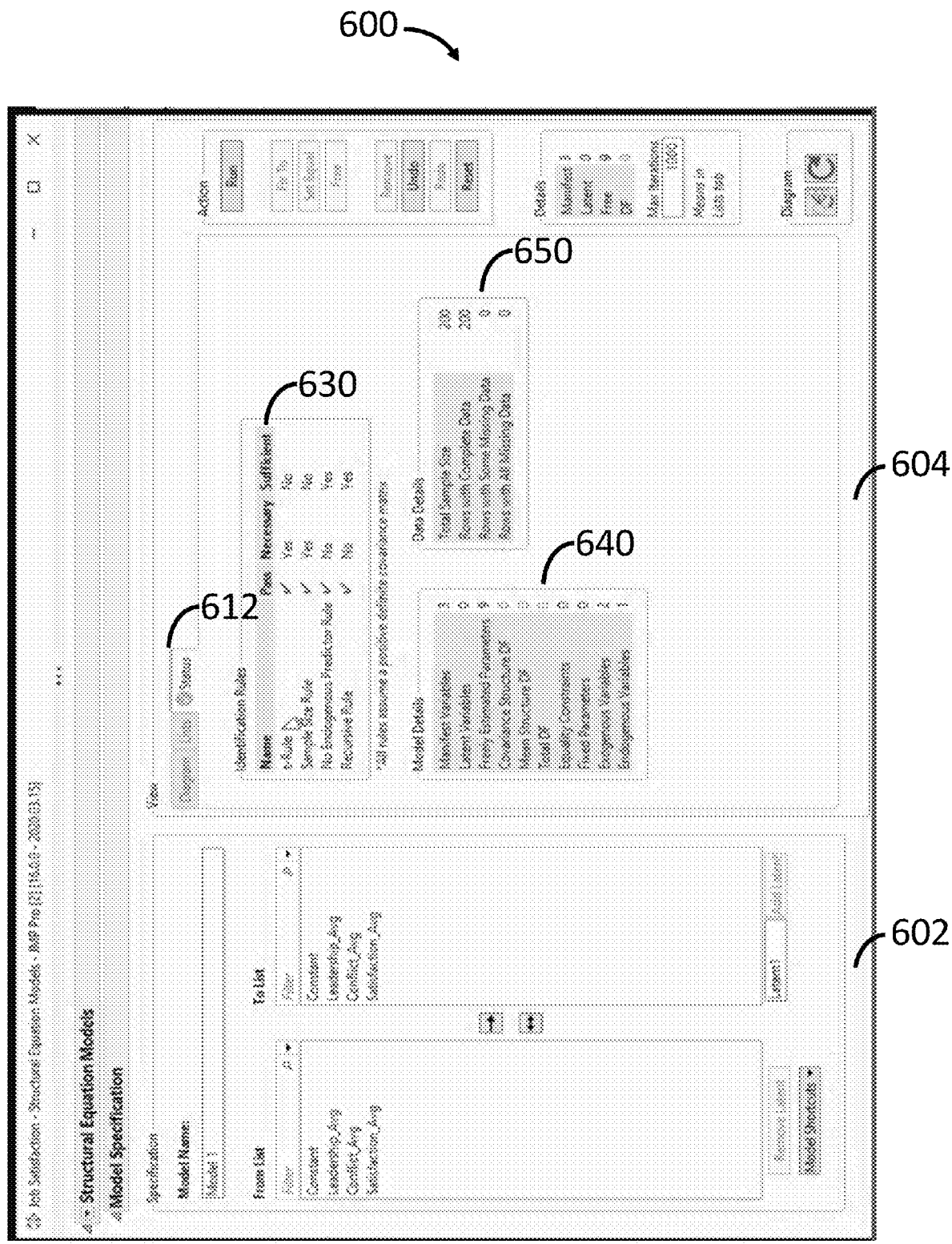
FIG. 6C is an example interactive graphical user interface for displaying status indication for a valid covariance path SEM modification, according to certain aspects of the present disclosure.

FIG. 6C is an example interactive graphical user interface for displaying status indication for a valid covariance path SEM modification, in accordance with the template that is illustrated in FIG. 3. The GUI 600 shows a specification window 602 at the left side of the GUI and shows a view window 604 on the right side of the GUI. A user may select a "Status" tab or indication 612 in the view window 604 to review a status indication of the identification rules, model details, and data details associated with the specified SEM. For example, the "Status" tab or indication 612 in the view window 604 shows that the identification rules table 630 associated with the covariance path SEM modification includes the t-Rule, the sample size rule, the no endogenous predictor rule, and the recursive rule and that each of these four rules passes. The status for each of these four rules is indicated by a green checkmark symbol. These four rules pass as stated in the description for FIG. 5C. The "Status" tab or indication 612 in the view window 604 also shows the model details table 640 and the data details table 650 associated with a valid covariance path SEM modification. As indicated in this example, the SEM is guaranteed to be identified when the "Sufficient" column of the identification rules table lists "Yes" for a corresponding rule that has passed.

Figure 6D:
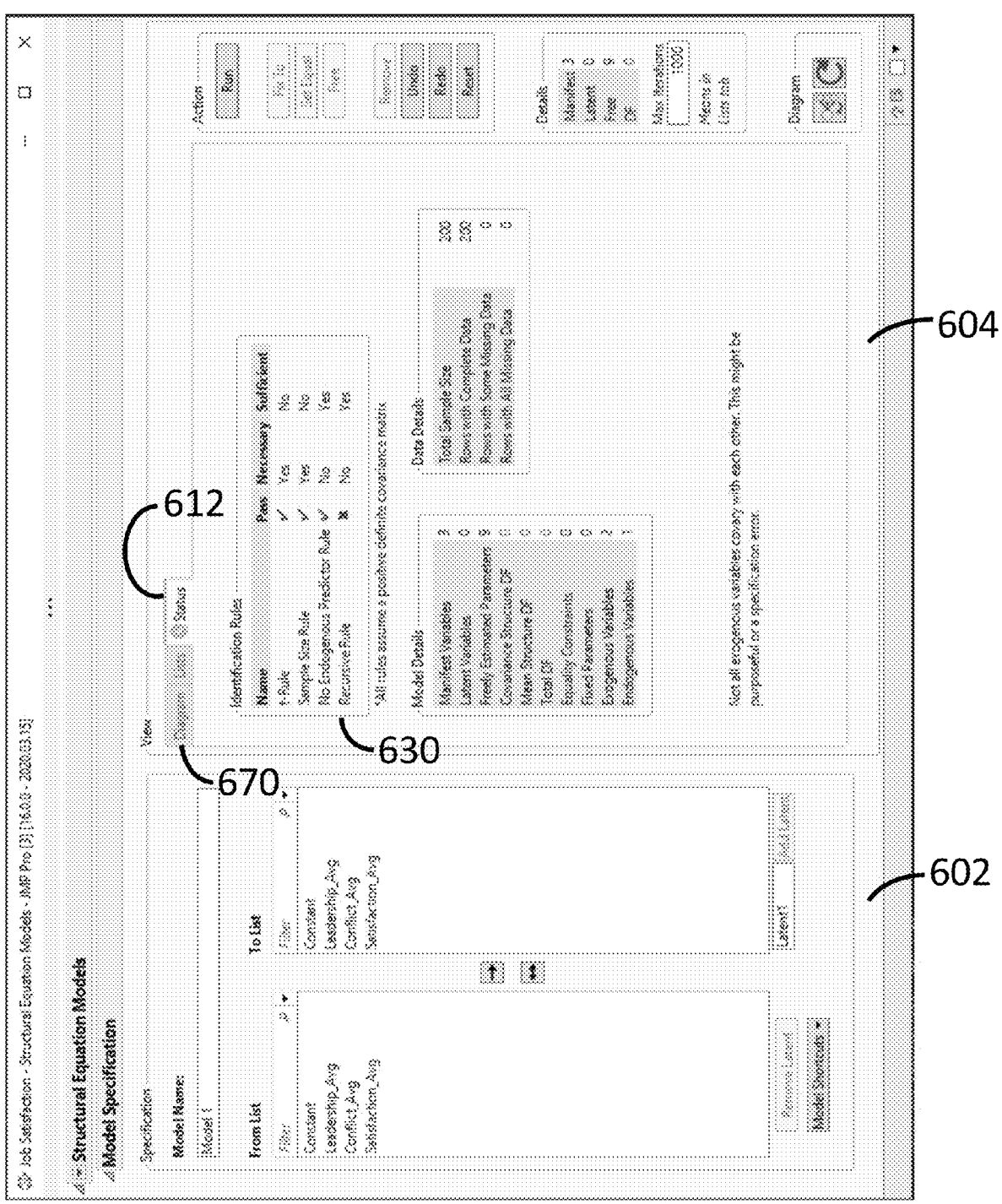
FIG. 6D is an example interactive graphical user interface for displaying a warning error status indication for a covariance path SEM modification, according to certain aspects of the present disclosure.

FIG. 6D is an example interactive graphical user interface for displaying a warning error status indication for a covariance path SEM modification, in accordance with the template that is illustrated in FIG. 3. The GUI 600 shows a specification window 602 at the left side of the GUI and shows a view window 604 on the right side of the GUI. A user may select a "Status" tab or indication 612 in the view window 604 to review a status indication of the identification rules, model details, and data details associated with the specified SEM. The user may also review the status indication for one or more launch conditions. For example, the "Status" tab or indication 612 in the view window 604 shows that the identification rules table 630 associated with the covariance path SEM modification includes the t-Rule, the sample size rule, the no endogenous predictor rule, and the recursive rule. The t-Rule, the sample size rule and the no endogenous predictor rule pass as indicated in the description for FIG. 5C. The recursive rule fails as indicated by the red "X" symbol. The recursive rule may fail, for example, if direct feedback loops exist in the model and residual variances of endogenous variables covary with one of its predictor's residual variances. The user may select the failed recursive rule in the identification rules table 630 to show a textual explanation of the violation that caused the rule to fail. Based on the textual explanation of the violation, the user may select a "Diagram" tab or indication 670 in the view window to return to the SEM path diagram for the covariance path SEM modification. The user may move, add, or remove any graphical indicators from/to the SEM path diagram in the specification window 602 or view window 604 for modifying the SEM. For example, the user may select "Undo" or "Reset" in the view window 604 to modify the SEM path diagram.

Figure 6E:
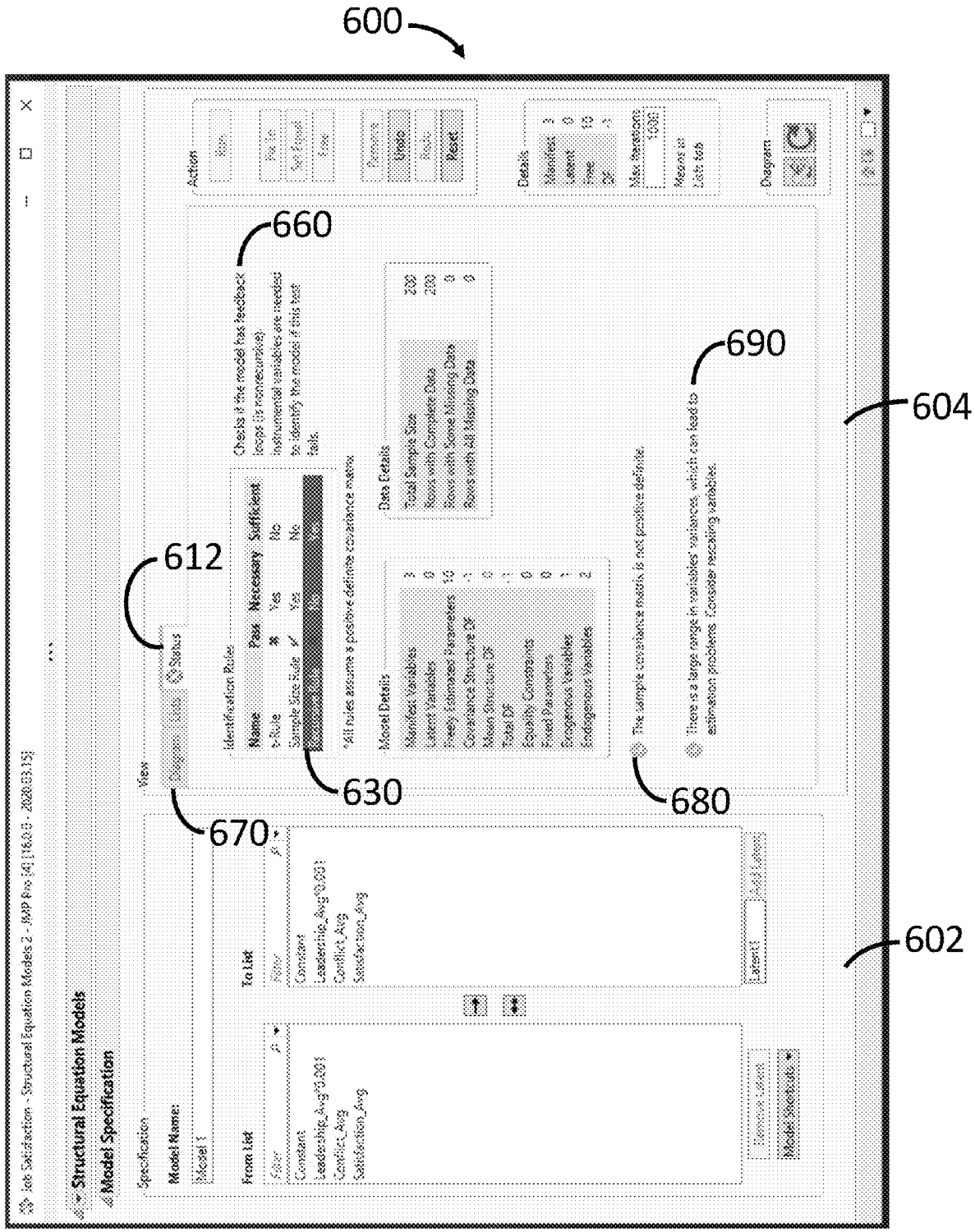
FIG. 6E is an example interactive graphical user interface for displaying a fatal error status indication for a covariance path SEM modification, according to certain aspects of the present disclosure.

FIG. 6E is an example interactive graphical user interface for displaying a fatal error status indication for a covariance path SEM modification, in accordance with the template that is illustrated in FIG. 3. The GUI 600 shows a specification window 602 at the left side of the GUI and shows a view window 604 on the right side of the GUI. A user may select a "Status" tab or indication 612 in the view window 604 to review a status indication of the identification rules, model details, and data details associated with the specified SEM. The user may also review the status indication for one or more launch conditions. For example, the "Status" tab or indication 612 in the view window 604 shows that the identification rules table 630 associated with the covariance path SEM modification includes the t-Rule, the sample size rule, and the recursive rule. The t-Rule and the recursive rule fail as indicated by the red "X" symbol. The user may select, for example, the recursive rule, in the identification rules table 630 to show a textual explanation 660 of the violation that caused the recursive rule to fail. The "Status" tab or indication 612 also shows that launch conditions for a positive definite sample covariance matrix is present 680 and that the range between variable variances exceeds a threshold 690 as indicated by the yellow "L" symbol and the textual explanation of the launch condition violations. Based on the textual explanations of the violations, the user may select a "Diagram" tab or indication 670 in the view window 604 to return to the SEM path diagram for the covariance path SEM modification. The user may move, add, or remove any graphical indicators from/to the SEM path diagram in the specification window 602 or view window 604 for modifying the SEM. For example, the user may select "Undo" or "Reset" in the view window 604 to modify the SEM path diagram.

Figure 7A:
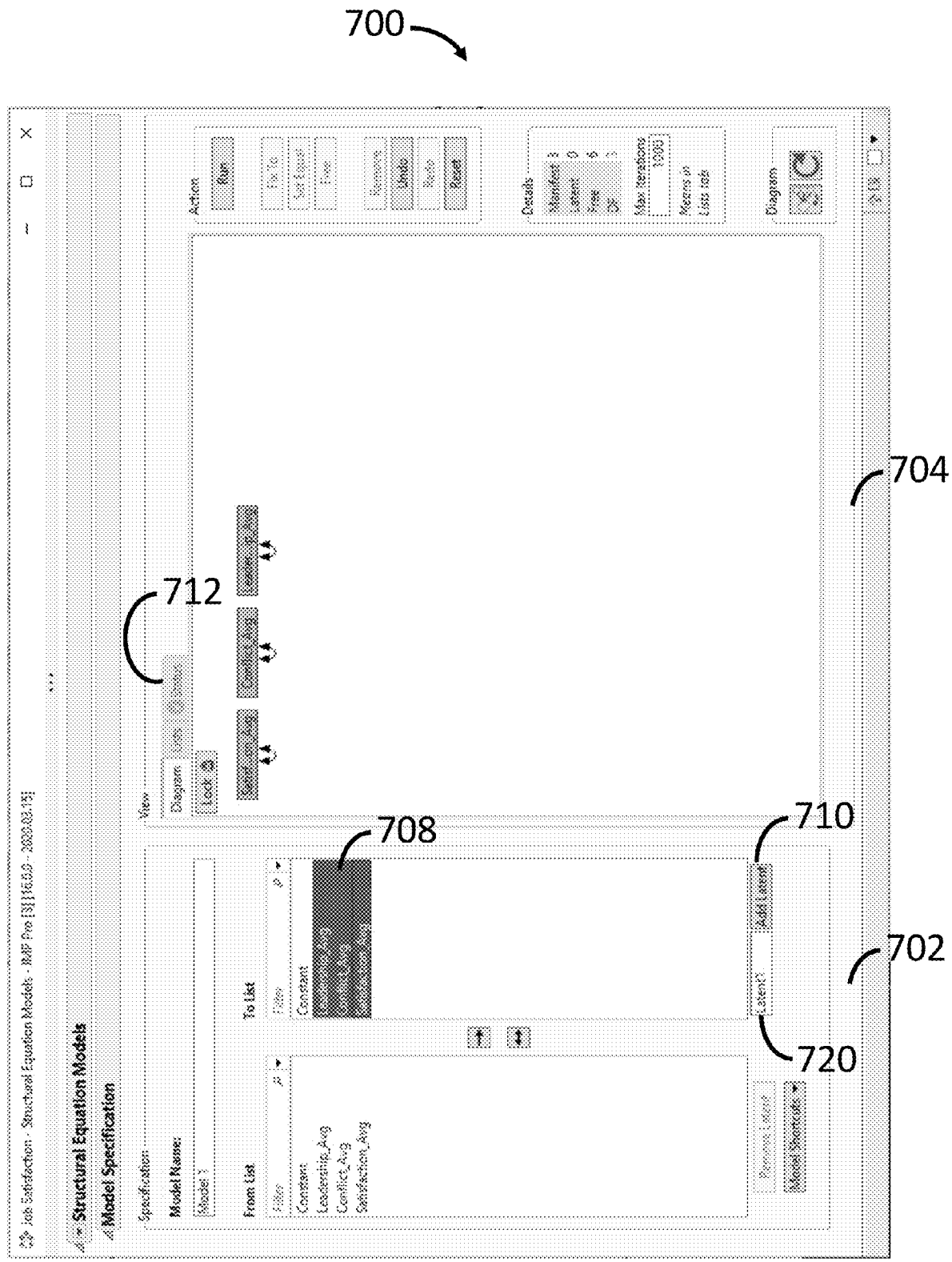
FIG. 7A is an example interactive graphical user interface for specifying a latent variable for an SEM and displaying the status indication of a latent variable SEM modification, according to certain aspects of the present disclosure.

FIG. 7A is an example interactive graphical user interface for specifying a latent variable for an SEM and displaying the status indication of a latent variable SEM modification, in accordance with the template that is illustrated in FIG. 3. The GUI 700 shows a specification window 702 at the left side of the GUI and shows a view window 704 on the right side of the GUI. The specification window 702 shows a user selection of graphical indicators 708 for one or more observed variables in one or more lists to be included in the SEM. The graphical indicators for the one or more observed variables includes a name for each of the one or more observed variables. The specification window 702 also shows a user entry of a latent variable name 720 and a user selection of a graphical indicator 710 for adding a latent variable. For example, the user may enter a name ("Latent1") for the latent variable in a box via the keyboard and then select a latent label, "Add Latent", with a mouse click to add the latent variable to the SEM. The view window 704 shows the status indication 712 of the SEM. The status indication can include a color and/or symbol, for example. For example, the GUI displays a checkmark symbol with a green color as the status indication for the SEM.

Figure 7B:
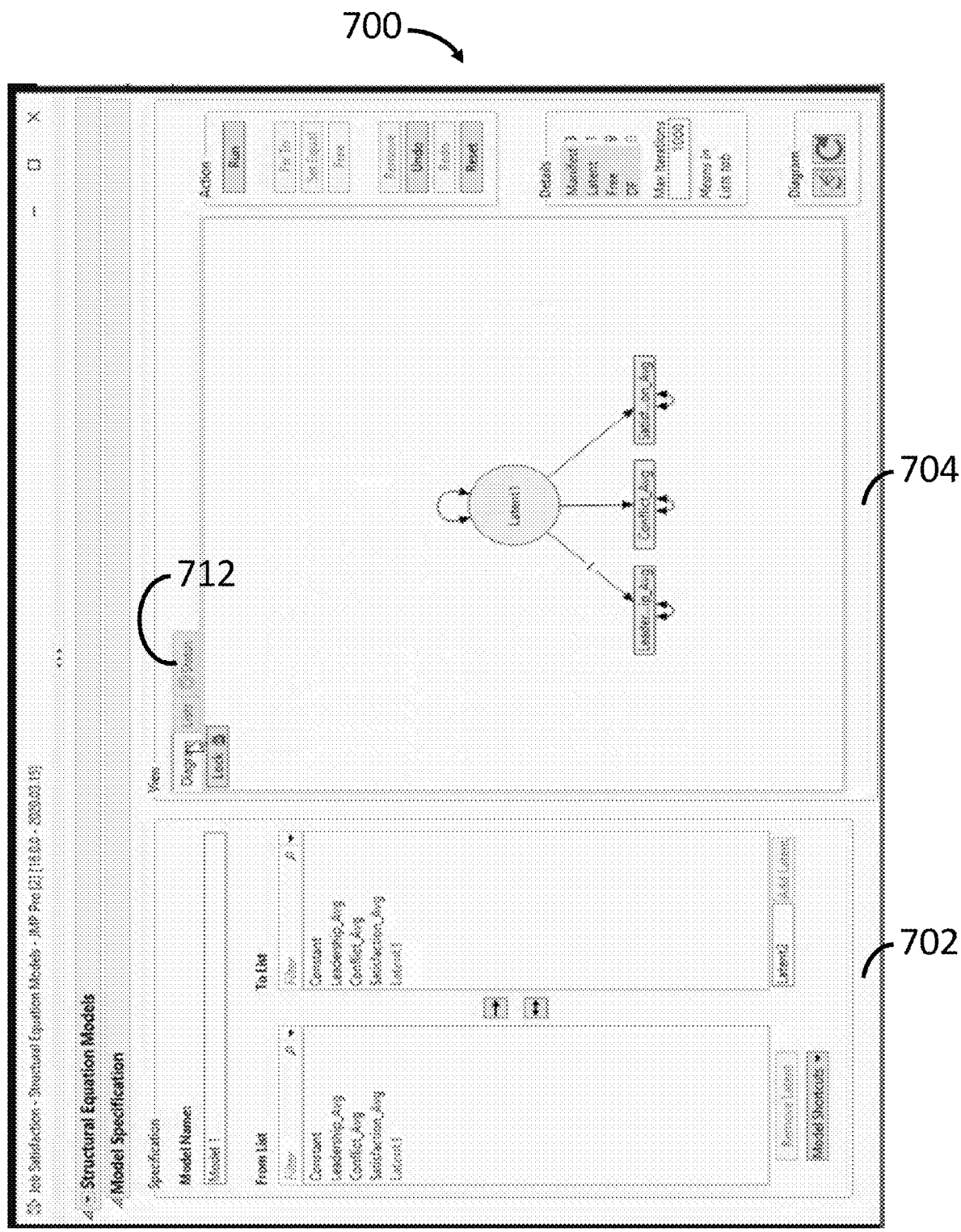
FIG. 7B is an example interactive graphical user interface for displaying the latent variable path diagram and the status indication for the latent variable SEM modification, according to certain aspects of the present disclosure.

FIG. 7B is an example interactive graphical user interface for displaying the latent variable path diagram and the status indication for the latent variable SEM modification, in accordance with the template that is illustrated in FIG. 3. The GUI 700 shows a specification window 702 at the left side of the GUI and shows a view window 704 on the right side of the GUI. The view window 704 shows the SEM path diagram that results from the user selections of the graphical indicators for the observed variables and the latent variable in the specification window 702. The view window 704 also shows the status indication 712 of the SEM. The status indication can include a color and/or symbol. For example, the GUI displays a checkmark symbol with a green color as the status indication for the SEM, which denotes a valid SEM modification.

Figure 7C:
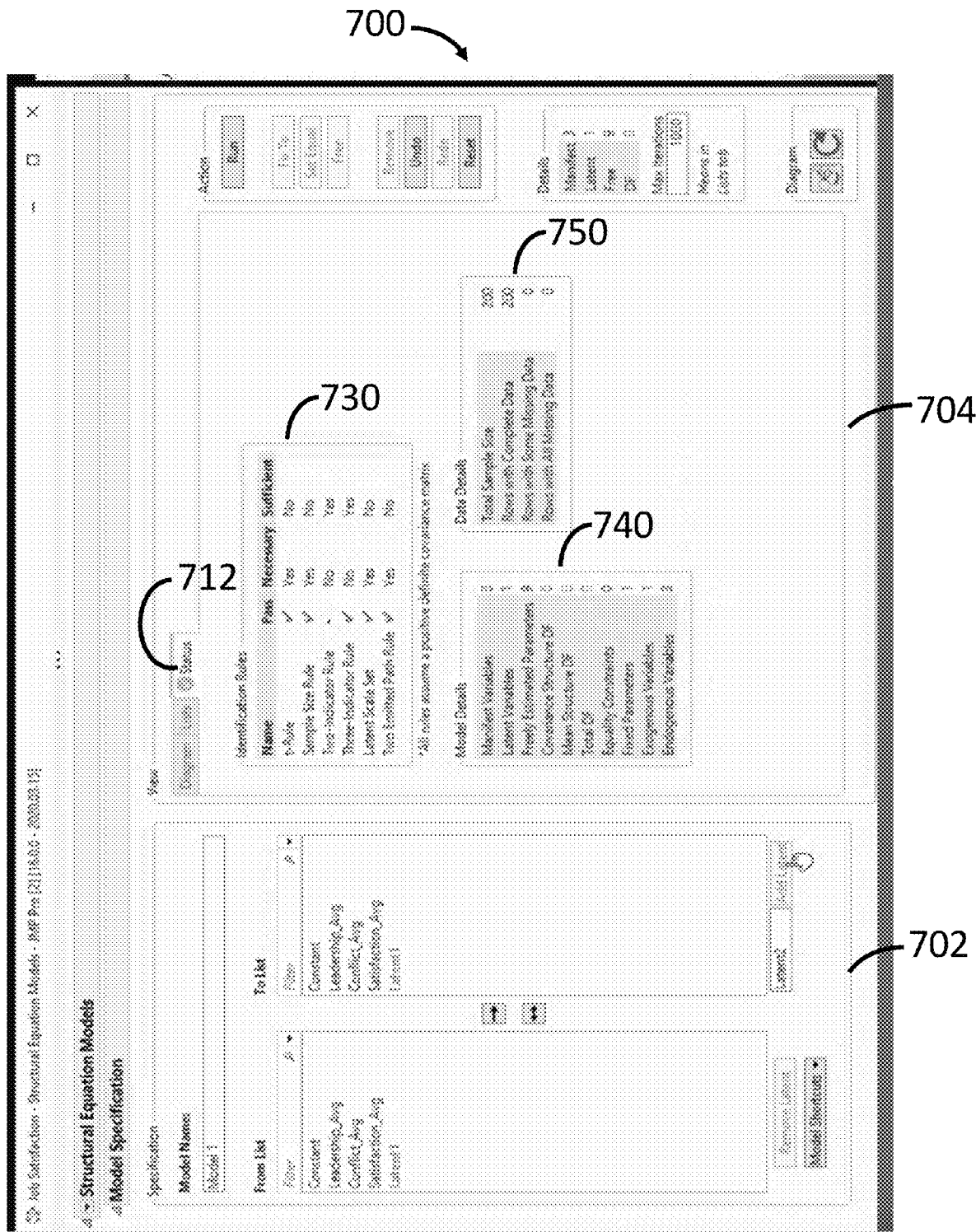
FIG. 7C is an example interactive graphical user interface for displaying status indication for a valid latent variable SEM modification, according to certain aspects of the present disclosure.

FIG. 7C is an example interactive graphical user interface for displaying status indication for a valid latent variable SEM modification, in accordance with the template that is illustrated in FIG. 3. The GUI 700 shows a specification window 702 at the left side of the GUI and shows a view window 704 on the right side of the GUI. A user may select a "Status" tab or indication 712 in the view window 704 to review a status indication of the identification rules, model details, and data details associated with the specified SEM. For example, the "Status" tab or indication 712 in the view window 704 shows that the identification rules table 730 associated with the latent variable SEM modification includes the t-Rule, the sample size rule, the two-indicator rule, the three-indicator rule, the latent scale set rule, and the two emitted path rule. Five of the six rules pass (the t-Rule, the sample size rule, the three-indicator rule, the latent scale set rule, and the two emitted path rule). The status for each of these five rules is indicated by a green checkmark symbol in the identification rules table 730. The t-Rule and sample size rule pass as indicated in the description for FIG. 5C. The status indication for the two-indicator rule shows a "-" symbol. The two-indicator rule is only applicable when there is one or more latent variables linked to only two observed variables in the SEM. The three-indicator rule passes if the latent scale set rule passes, there are no double loadings, there are no covariances among unique factors, and there are at least three non-zero loadings for each latent variable. The latent scale set rule passes if all latent variables have one fixed parameter in the loadings or the latent variable variance. The two emitted path rule passes if all latent variables have two paths, regression and/or loading paths, pointing to other variables and if latent variables have free variances and residual variances. The "Status" tab or indication 712 in the view window 704 also shows the model details table 740 and the data details table 750 associated with a valid latent variable SEM modification. As indicated in this example, the SEM is guaranteed to be identified when the "Sufficient" column of the identification rules table lists "Yes" for a corresponding rule that has passed.

Figure 7D:
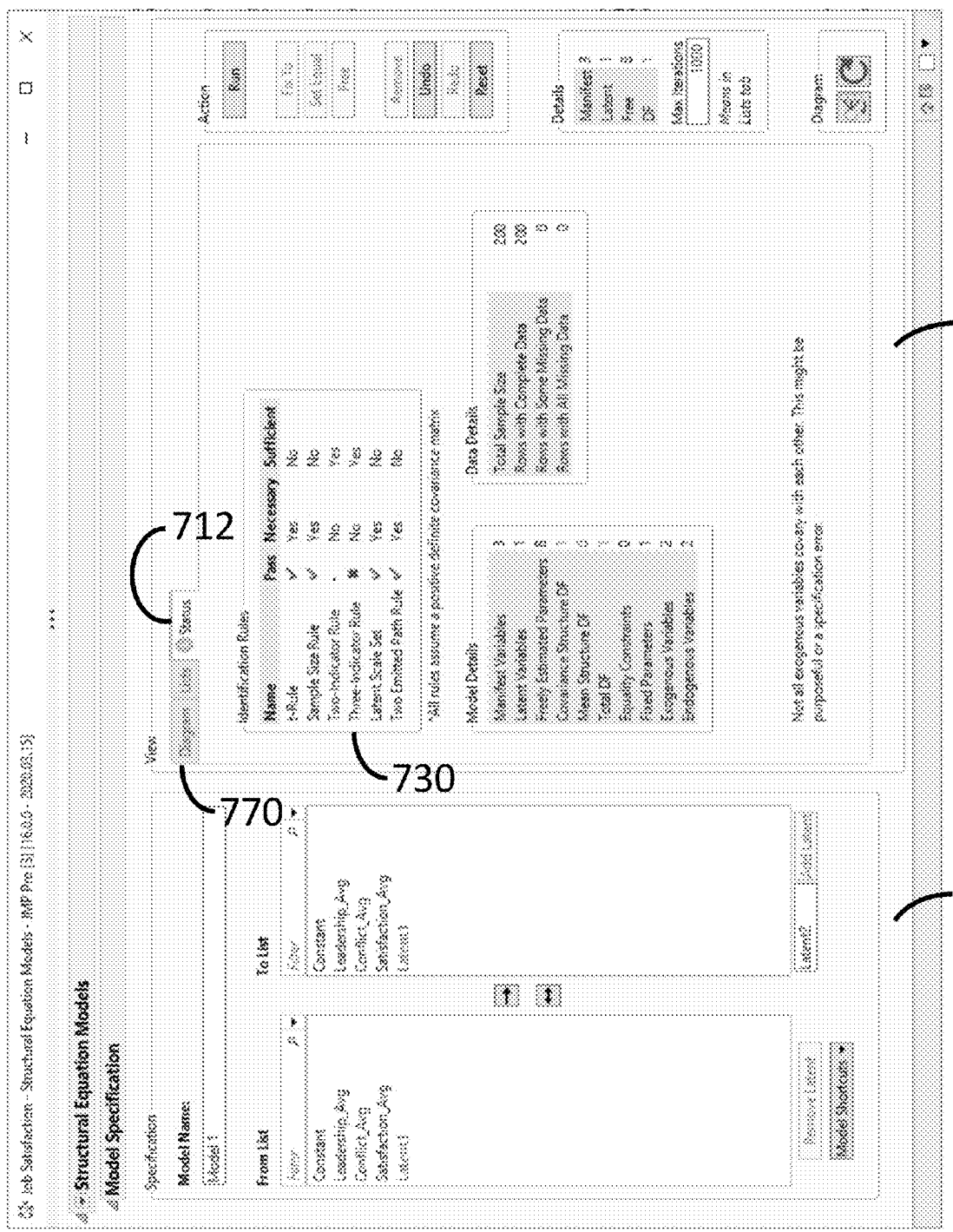
FIG. 7D is an example interactive graphical user interface for displaying a warning error status indication for a latent variable SEM modification, according to certain aspects of the present disclosure.

FIG. 7D is an example interactive graphical user interface for displaying a warning error status indication for a latent variable SEM modification, in accordance with the template that is illustrated in FIG. 3. The GUI 700 shows a specification window 702 at the left side of the GUI and shows a view window 704 on the right side of the GUI. A user may select a "Status" tab or indication 712 in the view window 704 to review a status indication of the identification rules, model details, and data details associated with the specified SEM. The user may also review the status indication for one or more launch conditions. For example, the "Status" tab or indication 712 in the view window 704 shows that the identification rules table 730 associated with the latent variable path SEM modification includes the t-Rule, the sample size rule, the two-indicator rule, the three-indicator rule, the latent scale set rule, and the two emitted path rule. Five of the six rules pass (the t-Rule, the sample size rule, the three-indicator rule, the latent scale set rule, and the two emitted path rule). The status for each of these five rules is indicated by a green checkmark symbol. The t-Rule and sample size rule pass as indicated in the description for FIG. 5C. The status indication for the two-indicator rule shows a "-" symbol. The two-indicator rule is only applicable when there is one or more latent variables linked to only two observed variables in the SEM. The three-indicator rule fails as indicated by the red "X" symbol in the identification rules table 730. This rule may fail, for example, if only two observed variables are used to create the latent variable. The user may select the failed three-indicator rule in the identification rules table 730 to show a textual explanation of the violation that caused the rule to fail. Based on the textual explanation of the violation, the user may select a "Diagram" tab or indication 770 in the view window 704 to return to the SEM path diagram for the latent variable SEM modification. The user may move, add, or remove any graphical indicators from/to the SEM path diagram in the specification window 702 or view window 704 for modifying the SEM. For example, the user may select "Undo" or "Reset" in the view window 704 to modify the SEM path diagram.

Figure 7E:
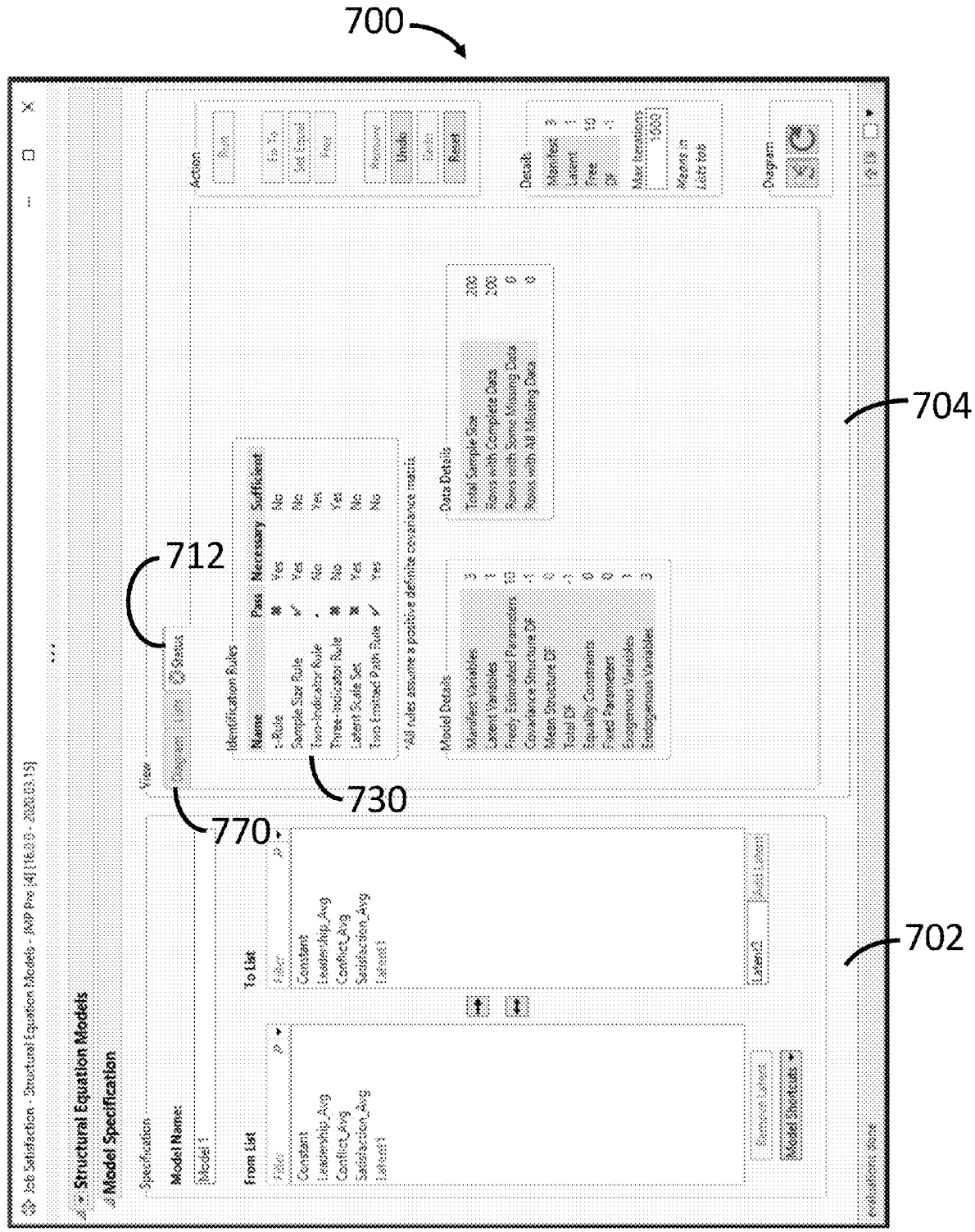
FIG. 7E is an example interactive graphical user interface for displaying a fatal error status indication for a latent variable SEM modification, according to certain aspects of the present disclosure.

FIG. 7E is an example interactive graphical user interface for displaying a fatal error status indication for a latent variable SEM modification, in accordance with the template that is illustrated in FIG. 3. The GUI 700 shows a specification window 702 at the left side of the GUI and shows a view window 704 on the right side of the GUI. A user may select a "Status" tab or indication 712 in the view window 704 to review a status indication of the identification rules, model details, and data details associated with the specified SEM. For example, the "Status" tab or indication 712 in the view window 704 shows that the identification rules table 730 associated with the latent variable path SEM modification includes the t-Rule, the sample size rule, the two-indicator rule, the three-indicator rule, the latent scale set rule, and the two emitted path rule. The t-Rule, the three-indicator rule, and the latent scale set rule fail as indicated by the red "X" symbol. The user may select each of these failed rules in the identification rules table 730 to show a textual explanation of the violation that caused the rules to fail. Based on the textual explanation of the violation, the user may select a "Diagram" tab or indication 770 in the view window to return to the SEM path diagram for the latent variable SEM modification. The user may move, add, or remove any graphical indicators from/to the SEM path diagram in the specification window 702 or view window 704 for modifying the SEM. For example, the user may select "Undo" or "Reset" in the view window 704 to modify the SEM path diagram.

Figure 8A:
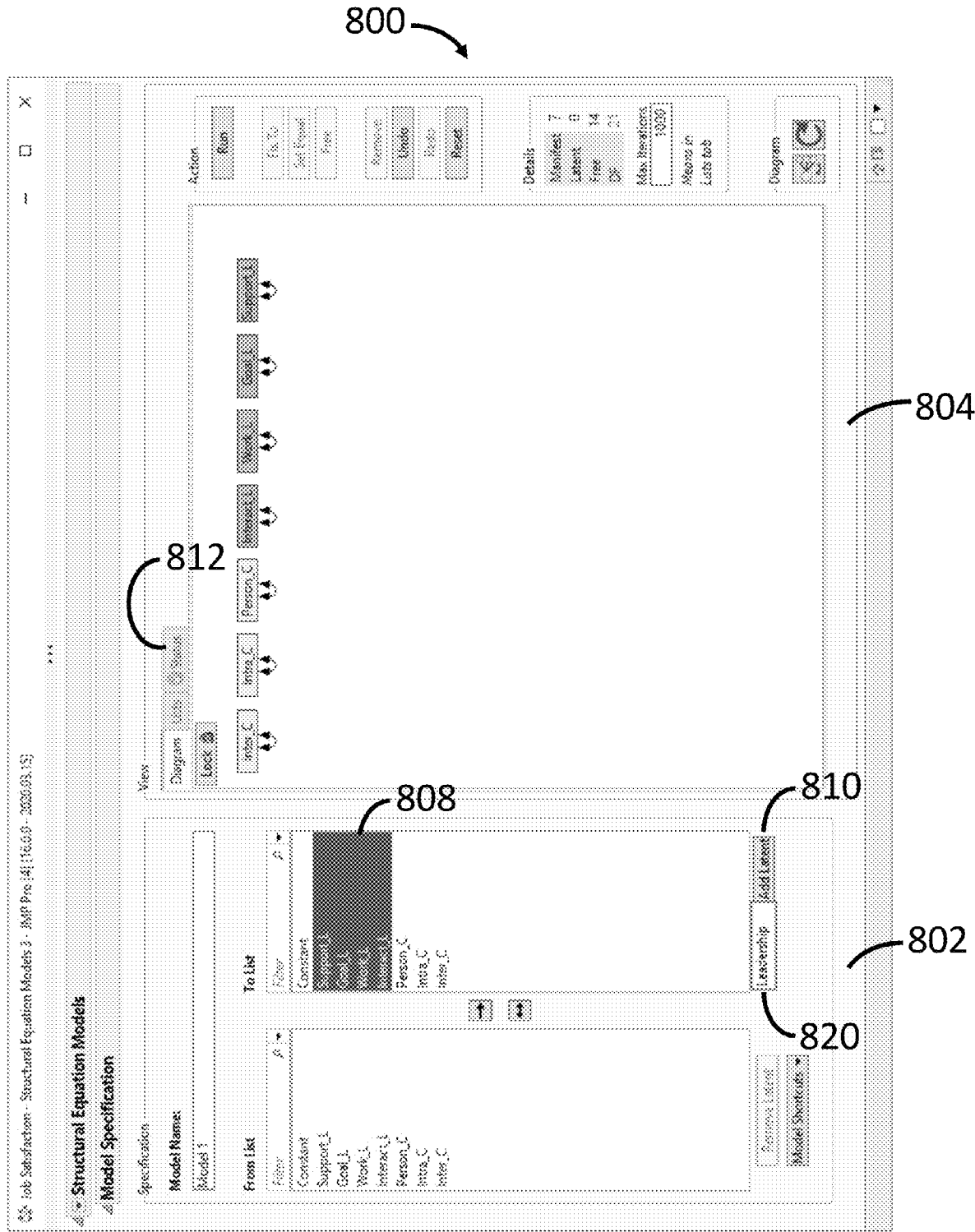
FIG. 8A is an example interactive graphical user interface for specifying a latent variable for an SEM and displaying the status indication of a latent variable SEM modification, according to certain aspects of the present disclosure.

FIG. 8A is an example interactive graphical user interface for specifying a latent variable for an SEM and displaying the status indication of a latent variable SEM modification, in accordance with the template that is illustrated in FIG. 3. The GUI 800 shows a specification window 802 at the left side of the GUI and shows a view window 804 on the right side of the GUI. The specification window 802 shows a user selection of graphical indicators 808 for one or more observed variables in one or more lists to be included in the SEM. The graphical indicators for the one or more observed variables includes a name for each of the one or more observed variables. The specification window 802 also shows a user entry of a latent variable name 820 and a user selection of a graphical indicator 810 for adding a latent variable. For example, the user may enter a name ("Leadership") for the latent variable in a box via the keyboard and then select the latent label, "Add Latent", with a mouse click to add the latent variable to the SEM. The view window 804 shows the status indication 812 of the SEM. The status indication can include a color and/or symbol. For example, the GUI displays a checkmark symbol with a green color as the status indication for the SEM.

Figure 8B:
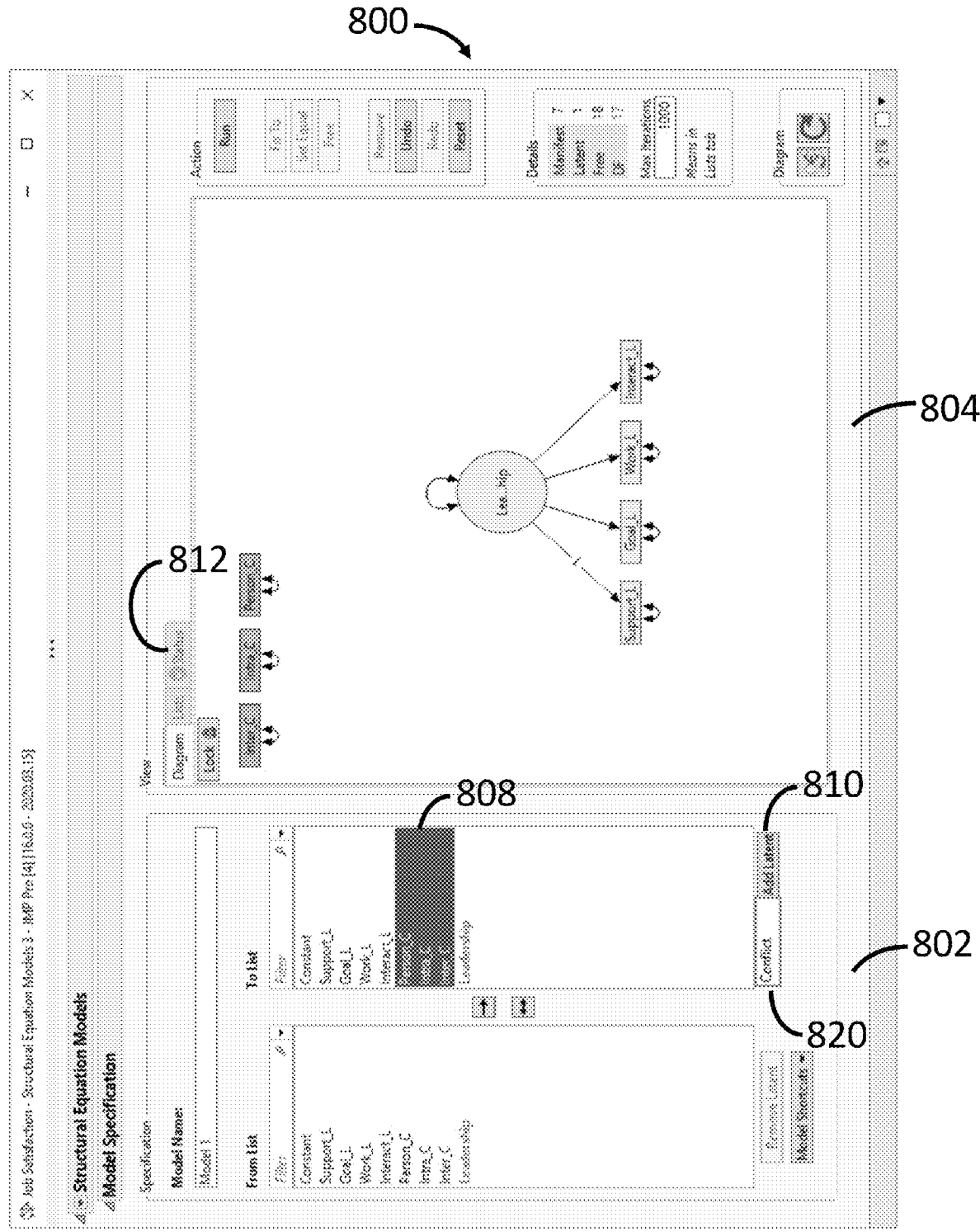
FIG. 8B is an example interactive graphical user interface for specifying a second latent variable for an SEM and displaying the status indication of a second latent variable SEM modification, according to certain aspects of the present disclosure.

FIG. 8B is an example interactive graphical user interface for specifying a second latent variable for an SEM and displaying the status indication of a second latent variable SEM modification, in accordance with the template that is illustrated in FIG. 3. The GUI 800 shows a specification window 802 at the left side of the GUI and shows a view window 804 on the right side of the GUI. The specification window 802 shows a user selection of graphical indicators 808 for one or more observed variables in one or more lists to be included in the SEM. The graphical indicators for the one or more observed variables includes a name for each of the one or more observed variables. The specification window 802 also shows a user entry of a latent variable name 820 and a user selection of a graphical indicator 810 for adding a second latent variable to the SEM specified in FIG. 8A. For example, the user may enter a name ("Conflict") for the latent variable in a box via the keyboard and then select the latent label, "Add Latent", with a mouse click to add the second latent variable to the SEM. The view window 804 shows the status indication 812 of the SEM. The status indication can include a color and/or symbol. For example, the GUI displays a checkmark symbol with a green color as the status indication for the SEM.

Figure 8C:
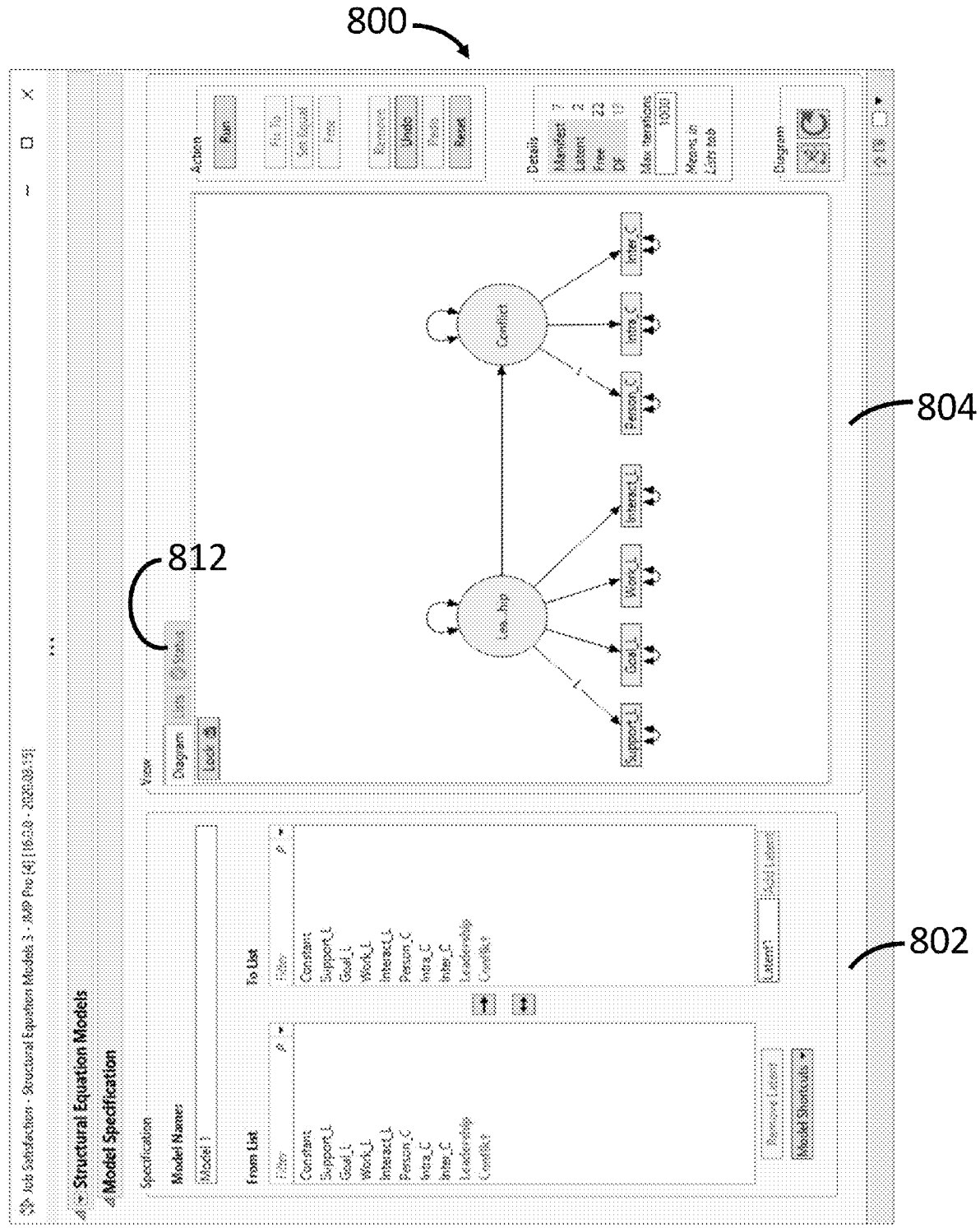
FIG. 8C is an example interactive graphical user interface for displaying the two latent variables' path diagram and the status indication for the second latent variable SEM modification, according to certain aspects of the present disclosure.

FIG. 8C is an example interactive graphical user interface for displaying the latent variables' path diagram and the status indication for the SEM modification, in accordance with the template that is illustrated in FIG. 3. The GUI 800 shows a specification window 802 at the left side of the GUI and shows a view window 804 on the right side of the GUI. The view window 804 shows the SEM path diagram that results from the user selections of the graphical indicators for the observed variables and the two latent variables in the specification window 802, which are linked with a regression path. The view window 804 also shows the status indication 812 of the SEM. The status indication can include a color and/or symbol. For example, the GUI displays a checkmark symbol with a green color as the status indication for the SEM, which denotes a valid SEM modification.

Figure 8D:
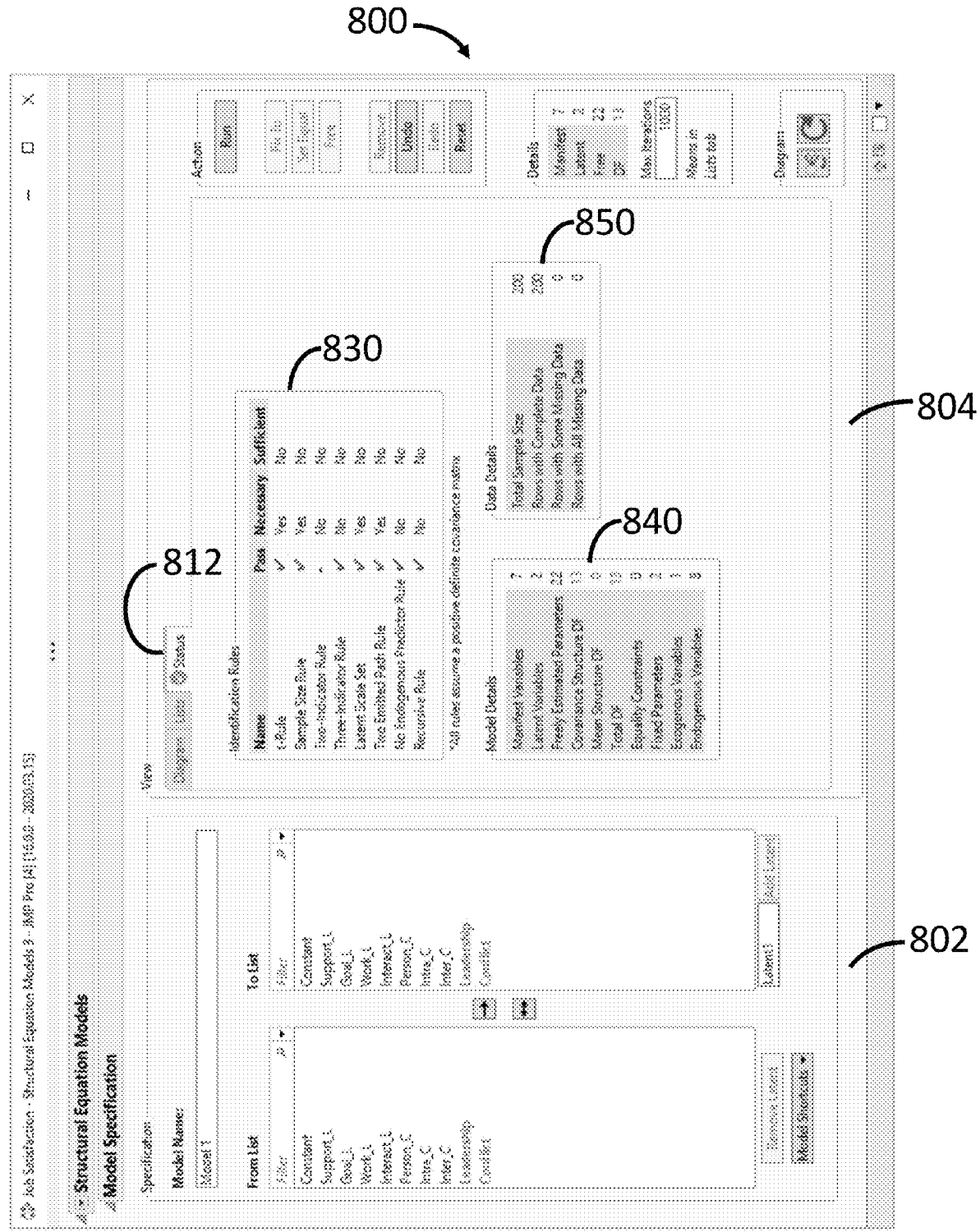
FIG. 8D is an example interactive graphical user interface for displaying status indication for a valid second latent variable SEM modification, according to certain aspects of the present disclosure.

FIG. 8D is an example interactive graphical user interface for displaying status indication for valid latent variables' SEM modifications, in accordance with the template that is illustrated in FIG. 3. The GUI 800 shows a specification window 802 at the left side of the GUI and shows a view window 804 on the right side of the GUI. A user may select a "Status" tab or indication 812 in the view window 804 to review a status indication of the identification rules, model details, and data details associated with the specified SEM. For example, the "Status" tab or indication 812 in the view window 804 shows that the identification rules table 830 associated with the two latent variables SEM modification includes the t-Rule, the sample size rule, the two-indicator rule, the three-indicator rule, the latent scale set rule, the two emitted path rule, the no endogenous predictor rule, and the recursive rule. Seven of the eight rules pass (the t-Rule, the sample size rule, the three-indicator rule, the latent scale set rule, the two emitted path rule, the no endogenous predictor rule, and the recursive rule). The status for each of these seven rules is indicated by a green checkmark symbol in the identification rules table 830. The t-Rule and sample size rule pass as indicated in the description for FIG. 5C. The status indication for the two-indicator rule shows a "-" symbol. The two-indicator rule passes if the latent scale set rule passes, there are no double loadings, there are no covariances among unique factors, and the latent variables with two indicators covary with at least another latent variable. However, in FIG. 8D the two-indicator rule does not apply because there are no latent variables linked to only two observed variables or indicators. Both latent variables have three indicators. The two emitted path rule passes if all latent variables have two paths, regression and/or loading paths, pointing to other variables and if latent variables have free variances and residual variances. The no endogenous predictor rule may pass if endogenous variables do not predict other variables and is only displayed when it passes because its failure does not indicate a specification error. The recursive rule may pass, for example, if no direct feedback loops exist in the model and no residual variances of endogenous variables covary with one of its predictor's residual variance. The "Status" tab or indication 812 in the view window 804 also shows the model details table 840 and the data details table 850 associated with a valid latent variable SEM modification.

Figure 8E:
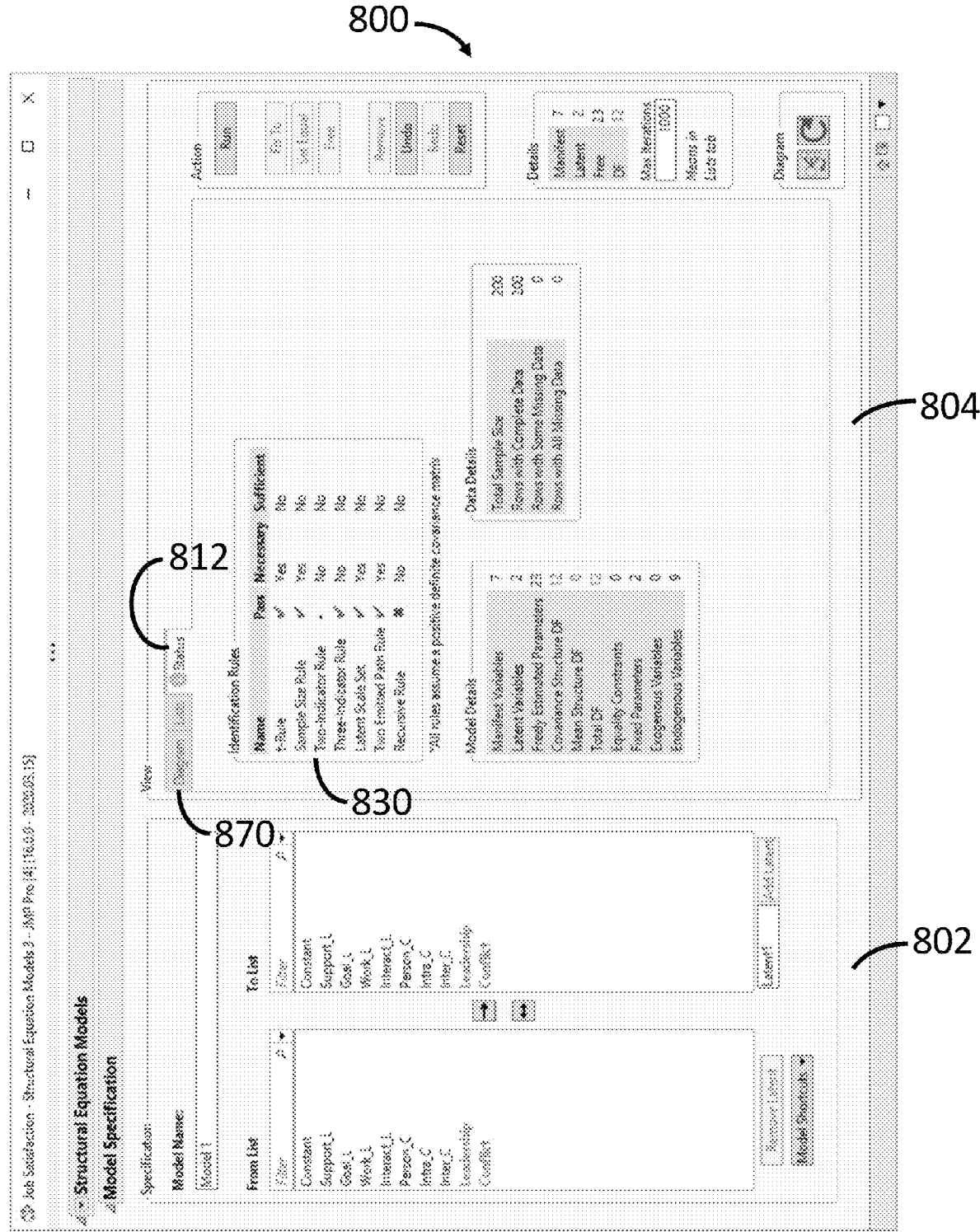
FIG. 8E is an example interactive graphical user interface for displaying a warning error status indication for a second latent variable SEM modification, according to certain aspects of the present disclosure.

FIG. 8E is an example interactive graphical user interface for displaying a warning error status indication for latent variables' SEM modification, in accordance with the template that is illustrated in FIG. 3. The GUI 800 shows a specification window 802 at the left side of the GUI and shows a view window 804 on the right side of the GUI. A user may select a "Status" tab or indication 812 in the view window 804 to review a status indication of the identification rules, model details, and data details associated with the specified SEM. For example, the "Status" tab or indication 812 in the view window 804 shows that the identification rules table 830 associated with the two latent variables SEM modification includes the t-Rule, the sample size rule, the two-indicator rule, the three-indicator rule, the latent scale set rule, the two emitted path rule, and the recursive rule. Five of the seven rules pass (the t-Rule, the sample size rule, the three-indicator rule, the latent scale set rule, and the two emitted path rule). The status for each of these five rules is indicated by a green checkmark symbol in the identification rules table 830. The t-Rule and sample size rule pass as indicated in the description for FIG. 5C. The status indication for the two-indicator rule shows a "-" symbol. The two-indicator rule does not apply because there are no latent variables linked to only two observed variables or indicators. When it applies, the two-indicator rule passes if the latent scale set rule passes, there are no double loadings, there are no covariances among unique factors, and the latent variables with two indicators covary with at least another latent variable. The two emitted path rule passes if all latent variables have two paths, regression and/or loading paths, pointing to other variables and if latent variables have free variances and residual variances. The no endogenous predictor rule status is not displayed in the identification table since this rule fails and its failure does not imply a problem with the model. The recursive rule fails as indicated by the red "X" symbol in the identification rules table and causes the "Status" indication to show the yellow "L" symbol or warning error as the status for the SEM. The recursive rule fails, for example, if direct feedback loops are present in the model and residual variances of endogenous variables covary with one of its predictor's residual variance. In this example, there are direct feedback loops present between the latent variables such that each latent variable is a predictor and an outcome of the other. The user may select each of these failed rules in the identification rules table 830 to show a textual explanation of the violation that caused the rules to fail. Based on the textual explanation of the violation, the user may select a "Diagram" tab or indication 870 in the view window 804 to return to the SEM path diagram for the latent variables' SEM modification. The user may move, add, or remove any graphical indicators from/to the SEM path diagram in the specification window 802 or view window 804 for modifying the SEM. For example, the user may select "Undo" or "Reset" in the view window 804 to modify the SEM path diagram. The user may also select "Run" in the view window 804 to execute the SEM.

Figure 8F:
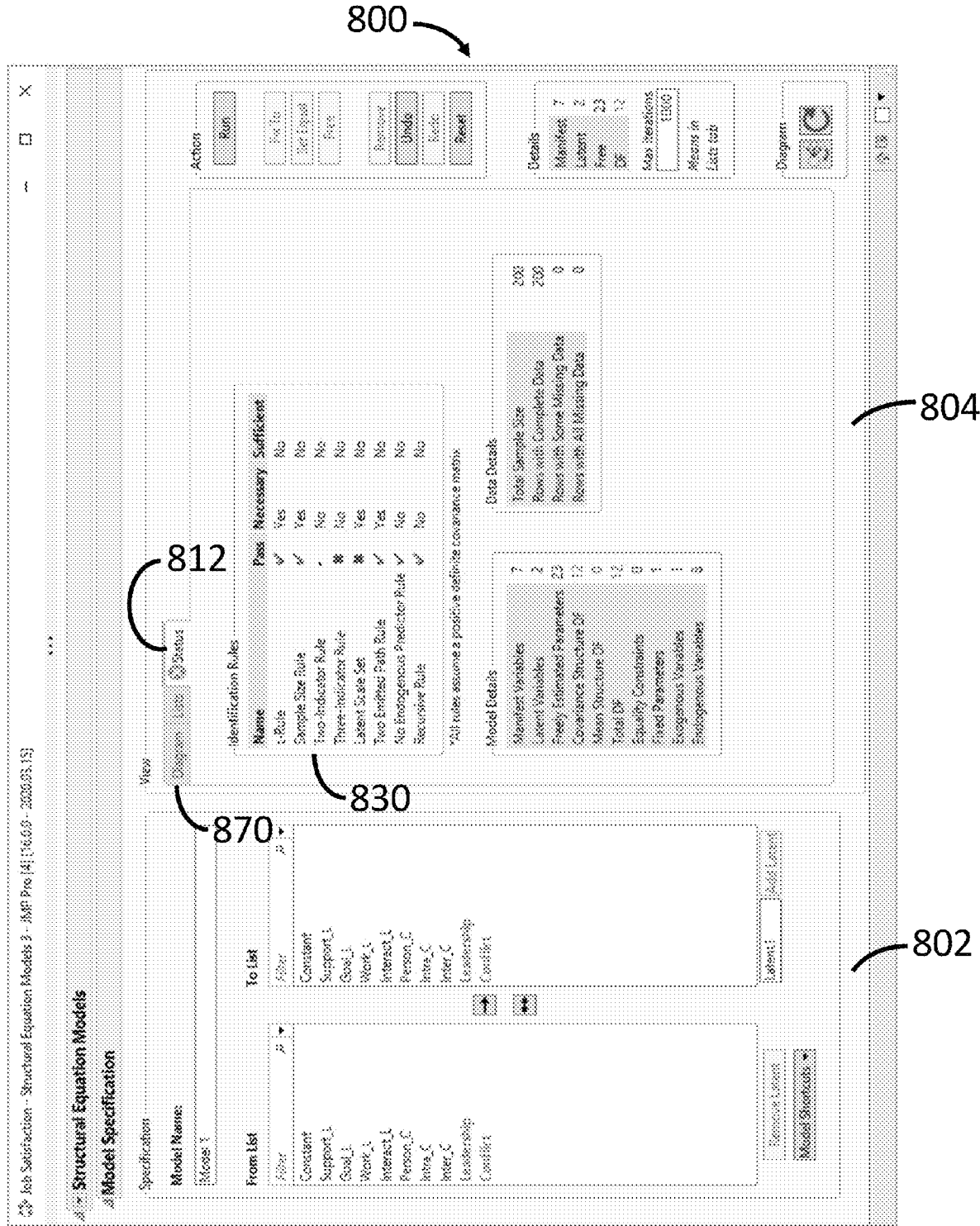
FIG. 8F is an example interactive graphical user interface for displaying a fatal error status indication for a second latent variable SEM modification, according to certain aspects of the present disclosure.

FIG. 8F is an example interactive graphical user interface for displaying a fatal error status indication for latent variables' SEM modification, in accordance with the template that is illustrated in FIG. 3. The GUI 800 shows a specification window 802 at the left side of the GUI and shows a view window 804 on the right side of the GUI. A user may select a "Status" tab or indication 812 in the view window 804 to review a status indication of the identification rules, model details, and data details associated with the specified SEM. For example, the "Status" tab or indication 812 in the view window 804 shows that the identification rules table 830 associated with the two latent variables SEM modification includes the t-Rule, the sample size rule, the two-indicator rule, the three-indicator rule, the latent scale set rule, the two emitted path rule, the no endogenous predictor rule, and the recursive rule. Five of the eight rules pass (the t-Rule, the sample size rule, the two emitted path rule, the no endogenous predictor rule, and the recursive rule). The status for each of these five rules is indicated by a green checkmark symbol in the identification rules table 830. The t-Rule and sample size rule pass as indicated in the description for FIG. 5C. The status indication for the two-indicator rule shows a "-" symbol. The two-indicator rule does not apply because there are no latent variables linked to only two observed variables or indicators. The three-indicator rule fails as indicated by the red "X" symbol in the identification rules table 830. This rule may fail if the latent scale set rule fails. The latent scale set rule may fail if all latent variables do not have one fixed parameter in the loadings or the latent variable variance. The user may select each of these failed rules in the identification rules table 830 to show a textual explanation of the violation that caused the rules to fail. Based on the textual explanation of the violation, the user may select a "Diagram" tab or indication 870 in the view window 804 to return to the SEM path diagram for the latent variables' path SEM modification. The user may move, add, or remove any graphical indicators from/to the SEM path diagram in the specification window 802 or view window 804 for modifying the SEM. For example, the user may select "Undo" or "Reset" in the view window 804 to modify the SEM path diagram. The user may also select "Run" in the view window 804 to execute the SEM.

FIG. 9A is an example interactive graphical user interface for executing an SEM, in accordance with the template that is illustrated in FIG. 3. The GUI 900 shows a specification window 902 at the left side of the GUI and shows a view window 904 on the right side of the GUI. The computing device receives a user input request to execute the SEM after the presentation of a graphical indicator for indicating a valid SEM modification. The "Status" tab or indication 912 shows a valid SEM modification as a green checkmark symbol. For example, the user may select the graphical indicator with a "Run" label in the view window 904 to execute the SEM.

FIG. 9B is an example interactive graphical user interface for displaying result of executed SEM, according to certain aspects of the present disclosure. The GUI 900 shows the result of the executed SEM. The result may include a model comparison table 992, a summary of fit table for the SEM 994, a parameter estimates table 996, and an SEM path diagram 998 for the specified SEM.

The foregoing description of certain examples, including illustrated examples, has been presented only for the purpose of illustration and description and is not intended to be exhaustive or to limit the disclosure to the precise forms disclosed. Numerous modifications, adaptations, formats, and uses thereof will be apparent to those skilled in the art without departing from the scope of the disclosure. The examples disclosed herein can be combined or rearranged to yield additional examples. The user interface window may include a plurality of menus and selectors such as drop-down menus, buttons, text boxes, hyperlinks, etc. as understood by a person of skill in the art. The plurality of menus and selectors may be accessed in various orders. An indicator may indicate one or more user selections from a user interface, one or more data entries into a data field of the user interface, one or more data items read from computer-readable medium or otherwise defined with one or more default values, etc.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be rearranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function. The processes may be performed in parallel using a plurality of threads and/or a plurality of worker computing devices.

Systems depicted in some of the figures can be provided in various configurations. In some examples, the systems can be configured as a distributed system where one or more components of the system are distributed across one or more networks in a cloud computing system.

What is claimed is:

1. A computer-program product tangibly embodied in a non-transitory machine-readable storage medium, the computer-program product including instructions operable to cause a computing device to:
receive a first user input request to modify a structural equation model (SEM) in a graphical user interface, the modifying including modifying one or more SEM path diagram elements in the SEM, the SEM path diagram elements comprising graphical indicators for observed variables, latent variables, variance paths, covariance paths, regression paths, or loading paths;
detect whether a first SEM path diagram element is modified responsive to the received first user input request;
based on the detection, determine whether the modification violates a first set of SEM rules, a second set of SEM rules, or one or more launch conditions prior to initiating execution of the SEM;
based on determining a violation of the first set of SEM rules prior to execution of the SEM,
present a first graphical error indicator for indicating a fatal error, and
present an indication of one or more of the rules in the first set of SEM rules that were violated to cause the fatal error; and
based on determining a violation of the second set of SEM rules or the one or more launch conditions prior to execution of the SEM,
present a second graphical error indicator for indicating a warning error; and
present an indication of one or more of the rules in the second set of SEM rules or the one or more launch conditions that were violated to cause the warning error; and
based on determining that there was not a violation prior to execution of the SEM, present a first graphical indicator for indicating a valid SEM modification.

2. The computer-program product of claim 1, wherein instructions operable to cause the computing device to:
receive a second user input request to modify the structural equation model (SEM) in the graphical user interface, the modification responsive to the second user input request including selecting one or more SEM path diagram elements in the SEM other than the SEM path diagram elements modified responsive to the first user input request;
detect whether the selected one or more SEM path diagram elements are modified responsive to the received second user input request;
based on the detection responsive to the received second user input request, determine whether the modification violates the first set of SEM rules, the second set of SEM rules, or the one or more launch conditions prior to execution of the SEM;
based on determining a violation of the first set of SEM rules prior to execution of the SEM,
present a third graphical error indicator for indicating a fatal error, and
present an indication of one or more of the rules in the first set of SEM rules that were violated to cause the fatal error; and
based on determining a violation of the second set of SEM rules or the one or more launch conditions prior to execution of the SEM,
present a fourth graphical error indicator for indicating a warning error; and
present an indication of one or more of the rules in the second set of SEM rules or the one or more launch conditions that were violated to cause the warning error; and
based on determining that there was not a violation prior to execution of the SEM, present a second graphical indicator for indicating a valid SEM modification.

3. The computer-program product of claim 2, instructions operable to cause the computing device to:
receive a third user input request to execute the SEM after the presentation of the second graphical indicator for indicating a valid SEM modification;
responsive to receiving the third user input request, execute the SEM; and
present a result of the executed SEM in the graphical user interface.

4. The computer-program product of claim 1, wherein a first set of graphical indicators for the one or more observed variables comprises a name for each of the one or more observed variables.

5. The computer-program product of claim 1, wherein a second set of graphical indicators comprises a unidirectional arrow to indicate a regression path, a bidirectional arrow to indicate a covariance path, and a latent label to indicate a latent variable.

6. The computer-program product of claim 1, wherein the first set of SEM rules comprises a t-Rule, a sample size rule, and a latent scale set rule.

7. The computer-program product of claim 1, wherein the second set of SEM rules comprises a two-indicator rule, a three-indicator rule, a two emitted path rule, a no endogenous predictor rule, and a recursive rule.

8. The computer-program product of claim 1, wherein the first graphical error indicator and the third graphical error indicator are a first color, the second graphical error indicator and the fourth graphical error indicator are a second color, and the first graphical indicator and the second graphical indicator are a third color.

9. The computer-program product of claim 1, wherein the presentation of the first graphical error indicator, the second graphical error indicator, the third graphical error indicator, the fourth graphical error indicator, the first graphical indicator and the second graphical indicator is displayed in a second graphical user interface, and wherein the second graphical user interface shows the sets of SEM rules, model details and data details of the SEM.

10. The computer-program product of claim 1, instructions operable to cause the computing device to:
present a textual explanation of the violation of the one or more SEM rules or the one or more launch conditions in a second graphical user interface.

11. The computer-program product of claim 1, instructions operable to cause the computing device to:
prior to receiving the first user input request, determine whether the launch condition comprises a non-positive definite sample covariance matrix;
based upon determining there is the non-positive definite sample covariance matrix,
present the second graphical error indicator for indicating the warning error; and
present the indication of the one or more launch conditions that were violated to cause the warning error; and
based upon determining there is not the non-positive definite sample covariance matrix,
determine whether there is a range between variances in the observed variables that exceeds a threshold, and
based upon determining there is the range between variances in the observed variables that exceeds the threshold,
present the second graphical error indicator for indicating the warning error; and
present the indication of the one or more launch conditions that were violated to cause the warning error.

12. The computer-program product of claim 1, instructions operable to cause the computing device to:
after receiving the first user input request to modify the SEM, determine whether the SEM has at least one of a latent variable and a regression path; and
based upon determining that the SEM has at least one of the latent variable and the regression paths, initiate a check of one or more of the rules in the sets of SEM rules, model details and data details of the SEM to determine whether the one or more of the rules in the sets of SEM rules were violated.

13. The computer-program product of claim 1, instructions operable to cause the computing device to:
present a first section of the graphical user interface for a user to select the graphical indicators for any of the observed variables, the latent variables, the variance paths, the covariance paths, the regression paths, or the loading paths; and
present a second section of the graphical user interface for the user to move, add or remove any of the graphical indicators into a graphical workspace for constructing the SEM.

14. A computer-implemented method comprising:
receiving a first user input request to modify a structural equation model (SEM) in a graphical user interface, the modifying including modifying one or more SEM path diagram elements in the SEM, the SEM path diagram elements comprising graphical indicators for observed variables, latent variables, variance paths, covariance paths, regression paths, or loading paths;
detecting whether a first SEM path diagram element is modified responsive to the received first user input request;
based on the detection, determining whether the modification violates a first set of SEM rules, a second set of SEM rules, or one or more launch conditions prior to initiating execution of the SEM;
based on determining a violation of the first set of SEM rules prior to execution of the SEM,
presenting a first graphical error indicator for indicating a fatal error, and
presenting an indication of one or more of the rules in the first set of SEM rules that were violated to cause the fatal error; and
based on determining a violation of the second set of SEM rules or the one or more launch conditions prior to execution of the SEM,
presenting a second graphical error indicator for indicating a warning error; and
presenting an indication of one or more of the rules in the second set of SEM rules or the one or more launch conditions that were violated to cause the warning error; and
based on determining that there was not a violation prior to execution of the SEM, presenting a first graphical indicator for indicating a valid SEM modification.

15. The computer-implemented method of claim 14, wherein the method further comprises:
receiving a second user input request to modify the structural equation model (SEM) in the graphical user interface, the modification responsive to the second user input request including selecting one or more SEM path diagram elements in the SEM other than the SEM path diagram elements modified responsive to the first user input request;
detecting whether the selected one or more SEM path diagram elements are modified responsive to the received second user input request;
based on the detection responsive to the received second user input request, determining whether the modification violates the first set of SEM rules, the second set of SEM rules, or the one or more launch conditions prior to execution of the SEM;
based on determining a violation of the first set of SEM rules prior to execution of the SEM,
presenting a third graphical error indicator for indicating a fatal error, and
presenting an indication of one or more of the rules in the first set of SEM rules that were violated to cause the fatal error; and
based on determining a violation of the second set of SEM rules or the one or more launch conditions prior to execution of the SEM,
presenting a fourth graphical error indicator for indicating a warning error; and
presenting an indication of one or more of the rules in the second set of SEM rules or the one or more launch conditions that were violated to cause the warning error; and
based on determining that there was not a violation prior to execution of the SEM, presenting a second graphical indicator for indicating a valid SEM modification.

16. The computer-implemented method of claim 15, wherein the method further comprises:
receiving a third user input request to execute the SEM after the presentation of the second graphical indicator for indicating a valid SEM modification;
responsive to receiving the third user input request, executing the SEM; and
presenting a result of the executed SEM in the graphical user interface.

17. The computer-implemented method of claim 14, wherein a first set of graphical indicators for the one or more observed variables comprises a name for each of the one or more observed variables.

18. The computer-implemented method of claim 14, wherein a second set of graphical indicators comprises a unidirectional arrow to indicate a regression path, a bidirectional arrow to indicate a covariance path, and a latent label to indicate a latent variable.

19. The computer-implemented method of claim 14, wherein the first graphical error indicator and the third graphical error indicator are a first color, the second graphical error indicator and the fourth graphical error indicator are a second color, and the first graphical indicator and the second graphical indicator are a third color.

20. The computer-implemented method of claim 14, wherein the presentation of the first graphical error indicator, the second graphical error indicator, the third graphical error indicator, the fourth graphical error indicator, the first graphical indicator and the second graphical indicator is displayed in a second graphical user interface, and wherein the second graphical user interface shows the sets of SEM rules, model details and data details of the SEM.

21. The computer-implemented method of claim 14, wherein the method further comprises:
presenting a textual explanation of the violation of the one or more SEM rules or the one or more launch conditions in a second graphical user interface.

22. The computer-implemented method of claim 14, wherein the method further comprises:
prior to receiving the first user input request, determining whether the launch condition comprises a non-positive definite sample covariance matrix;
based upon determining there is the non-positive definite sample covariance matrix,
presenting the second graphical error indicator for indicating the warning error; and
presenting the indication of the one or more launch conditions that were violated to cause the warning error; and
based upon determining there is not the non-positive definite sample covariance matrix,
determining whether there is a range between variances in the observed variables that exceeds a threshold, and
based upon determining there is the range between variances in the observed variables that exceeds the threshold,
presenting the second graphical error indicator for indicating the warning error; and
presenting the indication of the one or more launch conditions that were violated to cause the warning error.

23. The computer-implemented method of claim 14, wherein the method further comprises:
after receiving the first user input request to modify the SEM, determining whether the SEM has at least one of a latent variable and a regression path; and
based upon determining that the SEM has at least one of the latent variable and the regression paths, checking one or more of the rules in the sets of SEM rules, model details and data details of the SEM to determine whether the one or more of the rules in the sets of SEM rules were violated.

24. The computer-implemented method of claim 14, wherein the method further comprises:
presenting a first section of the graphical user interface for a user to select the graphical indicators for any of the observed variables, the latent variables, the variance paths, the covariance paths, the regression paths, or the loading paths; and
presenting a second section of the graphical user interface for the user to move, add or remove any of the graphical indicators into a graphical workspace for constructing the SEM.

25. A computing device comprising processor and memory, the memory containing instructions executable by the processor wherein the computing device is configured to:
receive a first user input request to modify a structural equation model (SEM) in a graphical user interface, the modifying including modifying one or more SEM path diagram elements in the SEM, the SEM path diagram elements comprising graphical indicators for observed variables, latent variables, variance paths, covariance paths, regression paths, or loading paths;
detect whether a first SEM path diagram element is modified responsive to the received first user input request;
based on the detection, determine whether the modification violates a first set of SEM rules, a second set of SEM rules, or one or more launch conditions prior to initiating execution of the SEM;
based on determining a violation of the first set of SEM rules prior to execution of the SEM,
present a first graphical error indicator for indicating a fatal error, and
present an indication of one or more of the rules in the first set of SEM rules that were violated to cause the fatal error; and
based on determining a violation of the second set of SEM rules or the one or more launch conditions prior to execution of the SEM,
present a second graphical error indicator for indicating a warning error; and
present an indication of one or more of the rules in the second set of SEM rules or the one or more launch conditions that were violated to cause the warning error; and
based on determining that there was not a violation prior to execution of the SEM, present a first graphical indicator for indicating a valid SEM modification.

26. The computing device of claim 25, wherein the computing device is configured to:
receive a second user input request to modify the structural equation model (SEM) in the graphical user interface, the modification responsive to the second user input request including selecting one or more SEM path diagram elements in the SEM other than the SEM path diagram elements modified responsive to the first user input request;
detect whether the selected one or more SEM path diagram elements are modified responsive to the received second user input request;
based on the detection responsive to the received second user input request, determine whether the modification violates the first set of SEM rules, the second set of SEM rules, or the one or more launch conditions prior to execution of the SEM;
based on determining a violation of the first set of SEM rules prior to execution of the SEM,
present a third graphical error indicator for indicating a fatal error, and present an indication of one or more of the rules in the first set of SEM rules that were violated to cause the fatal error; and based on determining a violation of the second set of SEM rules or the one or more launch conditions prior to execution of the SEM,
present a fourth graphical error indicator for indicating a warning error; and
present an indication of one or more of the rules in the second set of SEM rules or the one or more launch conditions that were violated to cause the warning error; and based on determining that there was not a violation prior to execution of the SEM, present a second graphical indicator for indicating a valid SEM modification.

27. The computing device of claim 26, wherein the computing device is configured to:
receive a third user input request to execute the SEM after the presentation of the second graphical indicator for indicating a valid SEM modification;
responsive to receiving the third user input request, execute the SEM; and
present a result of the executed SEM in the graphical user interface.

28. The computing device of claim 25, wherein the computing device is configured to:
prior to receiving the first user input request, determine whether the launch condition comprises a non-positive definite sample covariance matrix;
based upon determining there is the non-positive definite sample covariance matrix,
present the second graphical error indicator for indicating the warning error; and
present the indication of the one or more launch conditions that were violated to cause the warning error; and based upon determining there is not the non-positive definite sample covariance matrix,
determine whether there is a range between variances in the observed variables that exceeds a threshold, and based upon determining there is the range between variances in the observed variables that exceeds the threshold,
present the second graphical error indicator for indicating the warning error; and
present the indication of the one or more launch conditions that were violated to cause the warning error.

29. The computing device of claim 25, wherein the computing device is configured to:
after receiving the first user input request to modify the SEM, determine whether the SEM has at least one of a latent variable and a regression path; and
based upon determining that the SEM has at least one of the latent variable and the regression paths, initiate a check of one or more of the rules in the sets of SEM rules, model details and data details of the SEM to determine whether the one or more of the rules in the sets of SEM rules were violated.

30. The computing device of claim 25, wherein the computing device is configured to:
present a first section of the graphical user interface for a user to select the graphical indicators for any of the observed variables, the latent variables, the variance paths, the covariance paths, the regression paths, or the loading paths; and
present a second section of the graphical user interface for the user to move, add or remove any of the graphical indicators into a graphical workspace for constructing the SEM.

* * * * *

UNITED STATES PATENT AND TRADEMARK OFFICE
CERTIFICATE OF CORRECTION

| | | |
|---|---|---|
| PATENT NO. | : 11,017,308 B2 | Page 1 of 1 |
| APPLICATION NO. | : 17/069206 | |
| DATED | : May 25, 2021 | |
| INVENTOR(S) | : Laura Castro-Schilo et al. | |

It is certified that error appears in the above-identified patent and that said Letters Patent is hereby corrected as shown below:

In the Specification

Column 4, Line 10:
Delete the phrase "The patent or application file contains at least one drawing executed in color." and replace with --The patent or application file contains at least one drawing executed in color. Copies of this patent or patent application publication with color drawing(s) will be provided by the Office upon request and payment of the necessary fee.--

Signed and Sealed this
Fifth Day of October, 2021

Drew Hirshfeld
*Performing the Functions and Duties of the*
*Under Secretary of Commerce for Intellectual Property and*
*Director of the United States Patent and Trademark Office*